(12) United States Patent
Akagawa et al.

(10) Patent No.: US 7,092,593 B2
(45) Date of Patent: Aug. 15, 2006

(54) MICROACTUATOR DEVICE AND OPTICAL SWITCHING SYSTEM USING THE SAME

(75) Inventors: Keiichi Akagawa, Kamakura (JP); Yoshihiko Suzuki, Funabashi (JP); Katsuhiko Kurumada, Tokyo (JP); Toshiaki Tamamura, Tokyo (JP); Masatoshi Kanaya, Tokyo (JP)

(73) Assignees: Nikon Corporation, Tokyo (JP); NTT Electronics Corporation, Tokyo (JP)

( * ) Notice: Subject to any disclaimer, the term of this patent is extended or adjusted under 35 U.S.C. 154(b) by 0 days.

(21) Appl. No.: 11/099,253

(22) Filed: Apr. 4, 2005

(65) Prior Publication Data

US 2005/0213878 A1    Sep. 29, 2005

Related U.S. Application Data

(63) Continuation of application No. PCT/JP2003/012888, filed on Oct. 8, 2003.

(30) Foreign Application Priority Data

Oct. 11, 2002    (JP)    ............... 2002-298902

(51) Int. Cl.
*G02B 6/26* (2006.01)
(52) U.S. Cl. ............... 385/18; 385/15; 385/16
(58) Field of Classification Search ............ 385/15, 385/16, 18; 310/309
See application file for complete search history.

(56) References Cited

U.S. PATENT DOCUMENTS

| 5,208,880 | A | * | 5/1993 | Riza et al. ............... 385/18 |
| 5,322,258 | A | | 6/1994 | Bosch et al. |
| 6,658,177 | B1 | * | 12/2003 | Chertkow ............... 385/18 |
| 2004/0183395 | A1 | | 9/2004 | Akagawa et al. |

FOREIGN PATENT DOCUMENTS

| EP | 1 255 150 A1 | 11/2002 |
| JP | 11-231233 A | 8/1999 |
| JP | 2001-042233 A | 2/2001 |
| JP | 2001-264676 A | 9/2001 |
| JP | 2002-131685 A | 5/2002 |
| JP | 2002-287075 A | 10/2002 |

* cited by examiner

*Primary Examiner*—Jennifer Doan
(74) *Attorney, Agent, or Firm*—Frishauf, Holtz, Goodman & Chick, P.C.

(57) ABSTRACT

A movable plate is fastened to a substrate via flexure parts and can move upward and downward with respect to the substrate. The substrate serves as a fixed electrode. The movable plate has second electrode parts which generate an electrostatic force between these electrode parts and the substrate by virtue of a voltage that is applied across these electrode parts and the substrate and a current path which is disposed in a magnetic field, and which generates a Lorentz force when powered. A mirror advances into and withdraws from the optical path. When the movable plate moves from the lower position in which the electrostatic force is increased to the upper position, the control part controls the current so that the Lorentz force is generated in a downward orientation and gradually decreases while the movable plate moves from an intermediate position to the upper position.

20 Claims, 23 Drawing Sheets

Fig: 6

MICROACTUATOR DEVICE AND OPTICAL SWITCHING SYSTEM USING THE SAME

This is a continuation of PCT International Application No. PCT/JP2003/012888 filed on Oct. 8, 2003, the entire contents of which are hereby incorporated by reference.

TECHNICAL FIELD

The present invention relates to a microactuator device and an optical switching system using this microactuator device.

BACKGROUND ART

As advances have been made in micro-machining techniques, the need for microactuators has increased in various fields. Optical switches which switch optical paths utilized in optical communications, etc., may be cited as one example of a field in which microactuators are used. For instance, the optical switch disclosed in Japanese Patent Application Kokai No. 2001-42233 may be cited as one example of such an optical switch.

Microactuators generally have a fixed part, and a movable part that can be moved by a specified force, and are held in a specified position by the specified force. In conventional microactuators, an electrostatic force is often used as the specified force. For example, in the case of the microactuator that moves a micro-mirror used in the optical switch disclosed in Japanese Patent Application Kokai No. 2001-42233, the movable part can be moved to an upper position (position in which the micro-mirror reflects the incident light) or a lower position (position in which the micro-mirror allows the incident light to pass through "as is"), and can be held in these positions, by an electrostatic force.

In such microactuators that utilize an electrostatic force, a first electrode part is disposed on the fixed part, a second electrode part is disposed on the movable part, and an electrostatic force is generated between the first and second electrode parts by applying a voltage across these electrode parts.

In the case of conventional microactuators using an electrostatic force as described above, the movable part is moved by an electrostatic force and held in a specified position by an electrostatic force; accordingly, it is difficult to broaden the range of mobility of the movable part.

The electrostatic force $F_1$ that acts between parallel flat-plate electrodes is as shown in Equation (1) below, where $\epsilon$ is the dielectric constant, V is the potential difference, d is the inter-electrode distance, and S is the electrode surface area.

$$F_1 = \epsilon \times V^2 \times S / 2d^2 \qquad (1)$$

As is seen from Equation (1), the electrostatic force $F_1$ decreases abruptly in inverse proportion to the square of the inter-electrode distance d as the inter-electrode distance d increases. Accordingly, in the case of the conventional microactuators, it becomes difficult to move the movable part when the inter-electrode distance d exceeds a certain distance, so that it is difficult to broaden the mobility range of the movable part. Furthermore, if the potential difference (voltage across the electrodes) V is increased in an attempt to obtain a sufficient electrostatic force $F_1$ in the case of a large inter-electrode distance d, problems occur in terms of the dielectric strength, and a high-voltage generating part is required. Furthermore, if the electrode surface area S is increased in an attempt to obtain a sufficient electrostatic force $F_1$ in the case of a large inter-electrode distance d, the dimensions of the device are increased, so that miniaturization, which is the whole idea of a microactuator, is lost.

According, as a result of research, the present inventors conceived of the use of Lorentz force instead of electrostatic force in a microactuator.

It is known that the Lorentz force $F_2$ (N) is as shown in Equation (2) below, where B is the magnetic flux density (T), L is the length of the electric wire (m), and I is the current (A).

$$F_2 = I \times B \times L \qquad (2)$$

Since there is no term that stipulates the position of the electric wire in Equation (2), the Lorentz force $F_2$ that is generated at a constant magnetic flux density does not vary even if the position of the electric wire changes.

The Lorentz force can be caused to act on the movable part in a microactuator by installing a current path corresponding to the electric wire in the movable part, applying a magnetic field to this current path, and causing a current to flow through this current path. Even if the mobility range of the movable part is broadened compared to that of a conventional device, the application of a substantially uniform magnetic field in this range can easily be accomplished, for example, by using a magnet. Accordingly, even if the mobility range of the movable part is broadened, a constant force can be caused to act on the movable part regardless of the position of the movable part. Specifically, if such a Lorentz force is used instead of an electrostatic force in a microactuator, a constant driving force can be obtained (in principle) regardless of the position of the movable part (unlike a case in which an electrostatic force which shows a variation in the driving force according to the position of the movable part is used).

For example, in the case of an inter-electrode distance of 50 μm, an electrode shape of 50 μm square, a voltage of 5 V, and a dielectric constant of 1, the electrostatic force $F_1$ according to Equation (1) is 0.1 nN. On the other hand, if a current path with a length of 50 μm is created in a 50-μm-square electrode, and a magnetic field with a magnetic flux density of 0.1 T is applied, a Lorentz force of 5 nN is generated when a current of 1 mA is caused to flow. In order to obtain a force of 5 nN or greater using an electrostatic force, the inter-electrode distance must be set at 7 μm or less, or else the electrode shape must be set at 350 μm or greater. Accordingly, it is seen that the Lorentz force is more advantageous for obtaining the same driving force.

Furthermore, for example, if a 20-mm-square neodymium-iron-boron-type magnet is disposed in a position that is separated from the microactuator by a distance of 2 mm, a magnetic flux density of 0.1 T can easily be obtained.

Thus, the use of a Lorentz force instead of an electrostatic force in a microactuator makes it possible to expand the mobility range of the movable part without applying a high voltage or sacrificing compact size.

However, it has been demonstrated that a new problem arises in cases where a Lorentz force is used instead of an electrostatic force in a microactuator. Specifically, in cases where a Lorentz force is used instead of an electrostatic force, the movable part is moved to a specified position by means of this Lorentz force, and the movable part continues to be held in this position by the Lorentz force. Accordingly, since the current used to generate the Lorentz force must be constantly caused to flow in a continuous manner, the power consumption is conspicuously increased.

For instance, in the case of an application involving a large-scale optical switch, several tens of thousands of actuators are installed in a single optical switch device. Accordingly, there is a strong demand for a reduction in the power consumption of the respective actuators. For example, in the case of an optical switch with 100×100 channels, it is essential that (for example) MOS switches for selecting the channels be manufactured on a semiconductor substrate. Assuming that the resistance of one MOS switch is 10 kΩ, then in a case where a current of 1 mA is caused to flow continuously through this switch, the power consumption of one MOS switch is 10 mW. In a case where the total number of MOS switches is 10,000, the power consumption is as high as 100 W. As a result, the amount of heat generated is excessively large, so that there are problems in terms of practical use.

Furthermore, if it is possible to reduce the mechanical stress that is applied to the microactuator and a driven body by the shock or the like that accompanies the operation of the microactuator, then the useful life of this microactuator is extended, so that it is possible to increase the reliability during long-term operation, which is desirable. Moreover, it is desirable to increase the operating speed of the micro actuator.

DISCLOSURE OF THE INVENTION

The present invention was devised in light of such circumstances; it is an object of the present invention to provide a microactuator device and an optical switching system in which the mobility range of the movable part can be expanded without applying a high voltage or sacrificing compact size, and in which the power consumption can be reduced, and the reliability in the case of long-term operation can also be increased.

Furthermore, it is another object of the present invention to provide a microactuator device and an optical switching system in which the mobility range of the movable part can be expanded without applying a high voltage or sacrificing compact size, and in which the power consumption can be reduced, and the operating speed of the microactuator can also be increased.

As a result of dedicated research, the present inventors discovered that the object described above can be achieved by constructing a microactuator so that the utilization of an electrostatic force and the utilization of a Lorentz force can be coupled. Specifically, the present inventors discovered that the object described above can be achieved in a microactuator which comprises a fixed part and a movable part that is disposed so that this movable part can move with respect to the fixed part, by respectively disposing on the fixed part and movable part electrode parts which are used to make it possible to cause an electrostatic force to act on the movable part, and disposing in the movable part a current path which is used to cause a Lorentz force to act on the movable part.

By using such means, for example, it is possible to move the movable part by means of a Lorentz force alone in cases where the distance between the electrode part of the movable part and the electrode part of the fixed part is large, and to hold the movable part by means of an electrostatic force alone in cases where the distance between the electrode part of the movable part and the electrode part of the fixed part is decreased. As a result, the mobility range of the movable part can be expanded, and the power consumption can be reduced, without applying a high voltage or sacrificing compact size.

In the case of driving by an electrostatic force, since the charging-discharging of a capacitor is performed electrically, power consumption occurs only during charging and discharging, i.e., at points in time at which there is a change in the voltage. Accordingly, in cases where the movable part does not move frequently, so that the period for which the movable part is held in a specified position (a position which is such that the distance between the electrode part of the fixed part and the electrode part of the movable part is small) is relatively long, as in a microactuator used in an optical switch, etc., the power consumption can be greatly reduced if the force that is used to hold the movable part in the specified position is generated only by an electrostatic force. For example, in a case where the inter-electrode capacitance is 10 pF, the voltage is 5 V, and the movement of the movable part occurs once per minute, the power consumption of electrostatic driving is 4.2 pW. In a case where the number of such microactuators used is 10,000, the total power consumption of electrostatic driving is 42 nW. Furthermore, in the case of a position where the distance between the electrode part of the fixed part and the electrode part of the movable part is small, an electrostatic force of a sufficient magnitude can be obtained even if the voltage across the two electrode parts is relatively low and the electrode surface area is relatively small.

In the case of driving by a Lorentz force, a constant driving force can be obtained regardless of the position of the movable part; accordingly, if the movable part is moved by means of such a Lorentz force, the mobility range can be expanded. The power consumption of such a Lorentz force is as follows: for example, assuming that the resistance of the on-chip MOS switches for selecting the channels is 10 kΩ as in the example described above, then, in a case where a current of 1 mA is caused to flow through this MOS switch for 10 msec each minute (corresponding to the movement period of the movable part), the power consumption of Lorentz force driving is 1.7 µW. In a case where the number of microactuators is 10,000, the total power consumption of Lorentz force driving is 17 mW, so that the power consumption is greatly reduced compared to the power consumption of 100 W that occurs in the case of the constant Lorentz force driving. Most of the total power consumption is accounted for by the Lorentz force; however, this is not a major problem in practical terms.

Thus, by mounting both a device that generates an electrostatic force and a device that generates a Lorentz force in a microactuator, it is possible, for example, to reduce the power consumption by generating the force that is used to hold the movable part in a specified position by means of an electrostatic force, and to drive the microactuator by means of a Lorentz force in cases where the gap between the movable electrode and the fixed electrode is large, so that the mobility range can be broadened while suppressing the application of a high voltage and an increase in the electrode surface area.

Furthermore, the Lorentz force can be generated in both directions by varying the direction of flow of the current. Accordingly, the following discovery was made: namely, by appropriately setting the timing and the direction in which the Lorentz force is applied when the movable part is caused to move, it is possible to reduce the mechanical stress that is applied to the microactuator and a driven body by the shock or the like that accompanies the operation of the microactuator, so that the useful life is extended, thus making it possible to increase the reliability during long-term operation, and to increase the operating speed of the microactuator.

The present invention was devised on the basis of the novel findings described above that were obtained as a result of the research conducted by the present inventors.

Specifically, the microactuator device constituting the first invention that is used to achieve the object described above is a microactuator device comprising a microactuator, a magnetic field generating part and a control part, wherein (a) the microactuator has a fixed part and a movable part which is disposed so that this movable part can move with respect to the fixed part, (b) the fixed part has a first electrode part, (c) the movable part has a second electrode part which can generate an electrostatic force between itself and the first electrode part by means of a voltage that is applied across itself and the first electrode part, and a current path which is placed in a magnetic field, and which generates a Lorentz force when powered, (d) the magnetic field generating part generates the magnetic field, (e) the movable part is set so that this movable part can move between a first position in which the electrostatic force is increased and a second position in which the electrostatic force drops or disappears, and so that a return force that tends to cause this movable part to return to the second position is generated, (f) the current path is disposed so that a Lorentz force can be generated in the direction from the first position toward the second position, and in the opposite direction, (g) the control part controls the voltage that is applied across the first and second electrode parts and the current that flows through the current path, and (h) when the movable part is caused to move from the first position to the second position, the control part controls the current so that the Lorentz force is generated, and gradually decreases, in the direction extending from the second position toward the first position, at least while the movable part is moving from a point intermediate between the first position and the second position to a point in the vicinity of the second position.

The microactuator device constituting the second invention that is used to achieve the object described above is the first invention, wherein the control part controls the current so that when the movable part is caused to move from the first position to the second position, the Lorentz force is generated in the direction extending from the first position toward the second position while the movable part is moving from the first position to a point that is intermediate between the first position and the second position.

The microactuator device constituting the third invention that is used to achieve the object described above is a microactuator device comprising a microactuator, a magnetic field generating part and a control part, wherein (a) the microactuator has a fixed part and a movable part which is disposed so that this movable part can move with respect to the fixed part, (b) the fixed part has a first electrode part, (c) the movable part has a second electrode part which can generate an electrostatic force between itself and the first electrode part by means of a voltage that is applied across itself and the first electrode part, and a current path which is placed in a magnetic field, and which generates a Lorentz force when powered, (d) the magnetic field generating part generates the magnetic field, (e) the movable part is set so that this movable part can move between a first position in which the electrostatic force is increased and a second position in which the electrostatic force drops or disappears, and so that a return force that tends to cause this movable part to return to the second position is generated, (f) the current path is disposed so that a Lorentz force can be generated in the direction from the first position toward the second position, and in the opposite direction, (g) the control part controls the voltage that is applied across the first and second electrode parts and the current that flows through the current path, and (h) when the movable part is caused to move from the first position to the second position, the control part controls the current so that the Lorentz force is generated in the direction extending from the first position toward the second position while the movable part is moving from the first position to a point that is intermediate between the first position and the second position.

The microactuator device constituting the fourth invention that is used to achieve the object described above is any of the first through third inventions, wherein the movable part is constructed from a thin film.

The microactuator device constituting the fifth invention that is used to achieve the object described above is any of the first through fourth inventions, wherein the first electrode part and the second electrode part are disposed facing each other, the movable part is mechanically connected to the fixed part via a spring part that has spring properties so that the gap between the first and second electrode parts is narrowed when the movable part is positioned in the first position, and so that this gap is widened when the movable part is positioned in the second position, and the return force is generated by this spring part.

The microactuator device constituting the sixth invention that is used to achieve the object described above is any of the first through fifth inventions, wherein the control part controls the voltage and the current so that the movable part moves toward the first position when this movable part is caused to move toward the first position, and the control part controls the current so that this current does not flow, at least when in a steady holding state in which the movable part is held in the first position.

The optical switching system constituting the seventh invention that is used to achieve the object described above is an optical switching system comprising the microactuator device constituting any of the first through sixth inventions, and a mirror that is disposed on the movable part.

The optical switching system constituting the eighth invention that is used to achieve the object described above is the seventh invention, wherein a plurality of sets of the microactuator and the mirror are provided, and these sets are disposed in a two-dimensional configuration.

If these inventions are used, a microactuator device and an optical switching system can be provided in which the mobility range of the movable part can be expanded without applying a high voltage or sacrificing compact size, and in which the power consumption can be reduced, and the reliability in the case of long-term operation can be increased.

Furthermore, if these inventions are used, a microactuator device and an optical switching system can be provided in which the mobility range of the movable part can be expanded without applying a high voltage or sacrificing compact size, and in which the power consumption can be reduced, and the operating speed of the microactuator can be increased.

BEST MODE FOR CARRYING OUT THE INVENTION

Microactuator devices and optical switching systems using these microactuator devices according to the present invention will be described below with reference to the figures.

[First Working Configuration]

Figure 1:
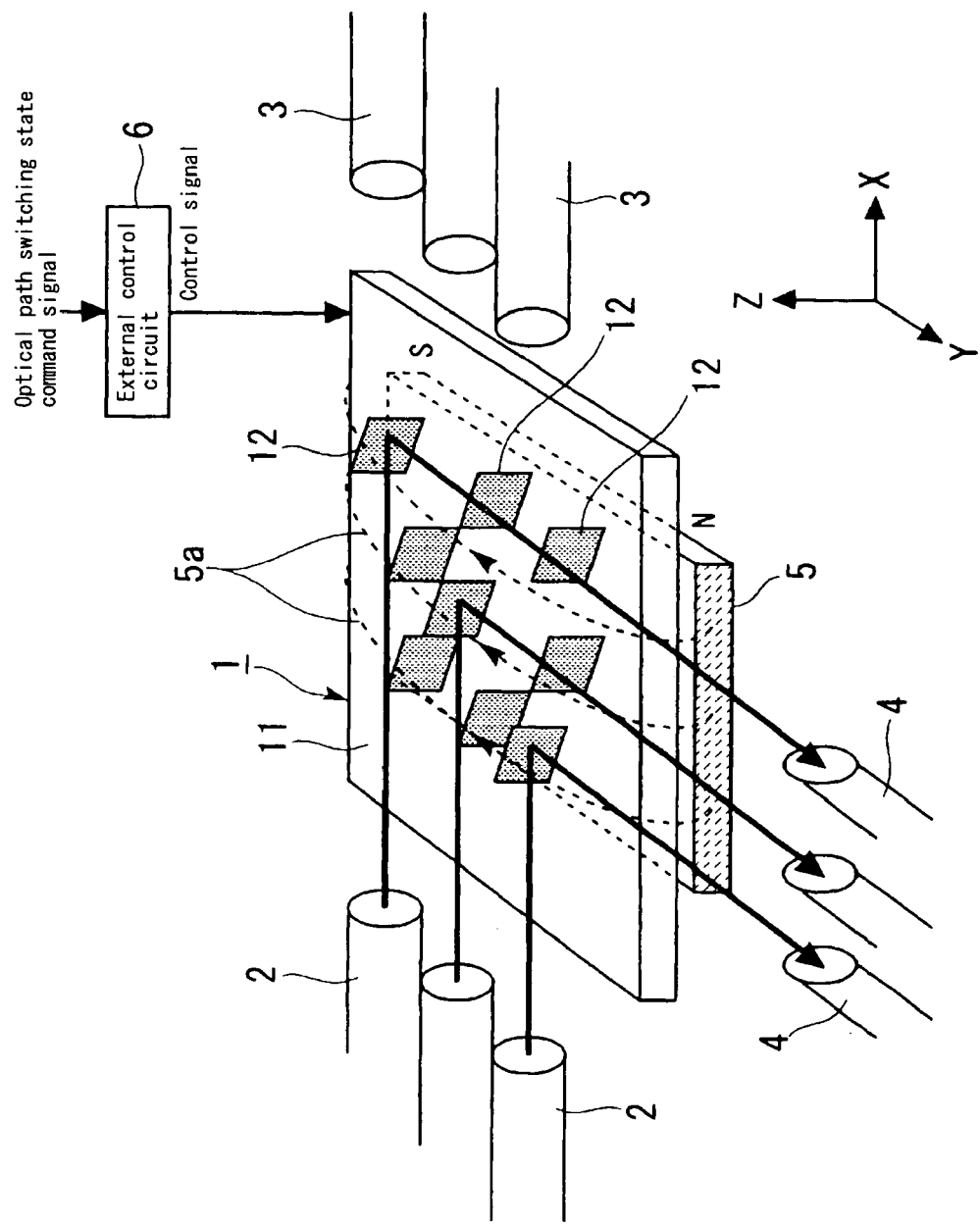
FIG. 1 is a schematic structural diagram showing an optical switching system constituting a first working configuration of the present invention.

FIG. 1 is a schematic structural diagram which shows one example of an optical switching system comprising an optical switch array 1 according to a first working configuration of the present invention. For convenience of description, X, Y and Z axes that are mutually perpendicular are defined as shown in FIG. 1 (the same is true of figures described later). The surface of the substrate 11 of the optical switch array 1 is parallel to the XY plane. Furthermore, for convenience of description, the + side in the direction of the Z axis is referred to as the upper side, and the – side in the direction of the Z axis is referred to as the lower side.

As is shown in FIG. 1, the optical switching system according to the present working configuration comprises an optical switch array 1, M optical fibers 2 used for light input, M optical fibers 3 used for light output, N optical fibers 4 used for light output, a magnet 5 used as a magnetic field generating part that generates a magnetic field (as will be described later) for the optical switch array 1, and an external control circuit 6 which sends control signals used to realize optical path switching states indicated by optical path switching state command signals to the optical switch array 1 in response to these optical path switching state command signals. In the example shown in FIG. 1, M=3 and N=3; however, M and N may respectively be arbitrary numbers.

In the present working configuration, as is shown in FIG. 1, the magnet 5 is a plate-form permanent magnet which is magnetized so that the + side in the direction of the Y axis is the N pole, and the – side in the direction of the Y axis is the S pole. This magnet 5 is disposed on the underside of the optical switch array 1, and generates a magnetic field indicated by the lines of magnetic force 5a for the optical switch array 1. Specifically, the magnet 5 generates a substantially uniform magnetic field which is oriented toward the – side along the direction of the Y axis with respect to the optical switch array 1. Of course, it would also be possible to use (for example) a permanent magnet of some other shape or an electromagnet, etc., as the magnetic field generating part instead of the magnet 5.

As is shown in FIG. 1, the optical switch array 1 comprises a substrate 11 and M×N mirrors 12 which are disposed on the substrate 11. The M optical fibers 2 used for light input are disposed in a plane parallel to the XY plane so that these optical fibers guide incident light in the direction of the X axis from one side of the substrate 11 in the direction of the X axis. The M optical fibers 3 used for light output are disposed on the other side of the substrate 11 so that these optical fibers respectively face the M optical fibers 2 used for light input, and are disposed in a plane parallel to the XY plane so that light that advances in the direction of the X axis without being reflected by any of the mirrors 12 of the optical switch array 1 is incident on these optical fibers. The N optical fibers 4 used for light output are disposed in a plane parallel to the XY plane so that light that is reflected by any of the mirrors 12 of the optical switch array 1 and that therefore advances in the direction of the Y axis is incident on these optical fibers. The M×N mirrors 12 are disposed on the substrate 11 in the form of a two-dimensional matrix so that these mirrors can be moved rectilinearly in the direction of the Z axis by microactuators (described later) in a manner that allows the mirrors to advance into and withdraw from the respective intersection points between the exit optical paths of the M optical fibers 2 used for light input and the entry optical paths of the optical fibers 4 used for light output. In the present example, furthermore, the orientation of the mirrors 12 is set so that the normal of these mirrors forms a 45° angle with the X axis in the plane parallel to the XY plane. Of course, this angle can be appropriately altered, and in cases where the angle of the mirrors 12 is altered, the orientation of the optical fibers 4 used for light output may be set in accordance with this angle. Furthermore, FIG. 1 shows a device in which switching is performed by causing the light beams to intersect in space; lenses may also be inserted in order to improve the coupling of the light beams with the fiber ends.

In this optical switching system, the optical path switching principle itself is the same as the optical path switching principle of a conventional two-dimensional optical switch.

Figure 2:
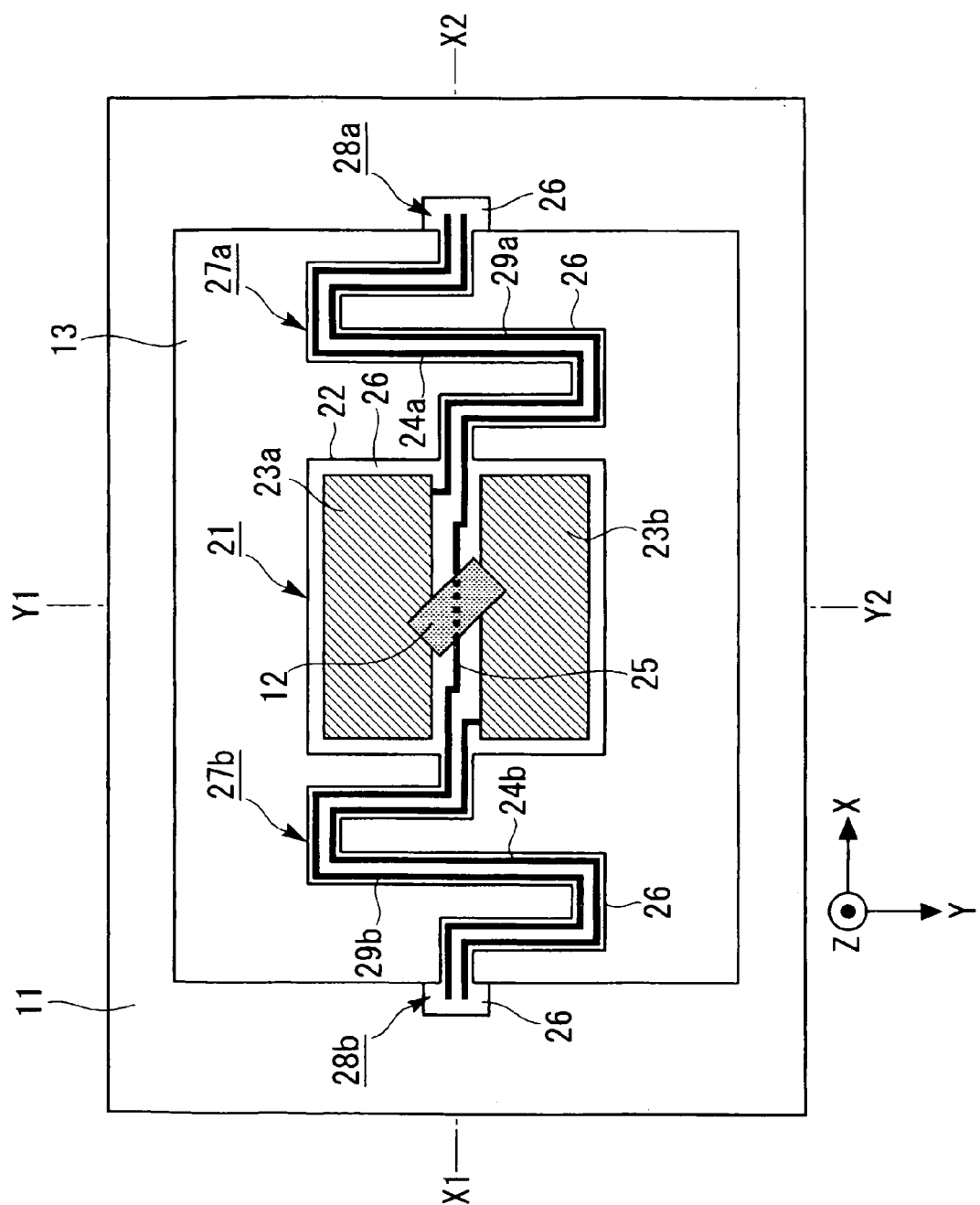
FIG. 2 is a schematic plan view showing one of the optical switches constituting the optical switch array used in the optical switching system shown in FIG. 1.
Figure 3:
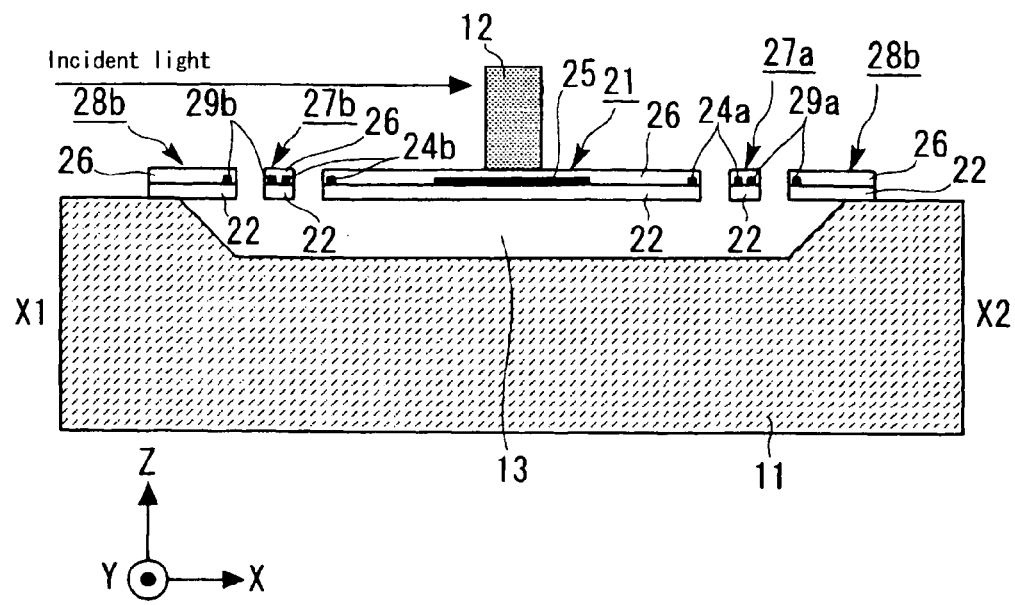
FIG. 3 is a schematic sectional view along line X1–X2 in FIG. 2.
Figure 4:
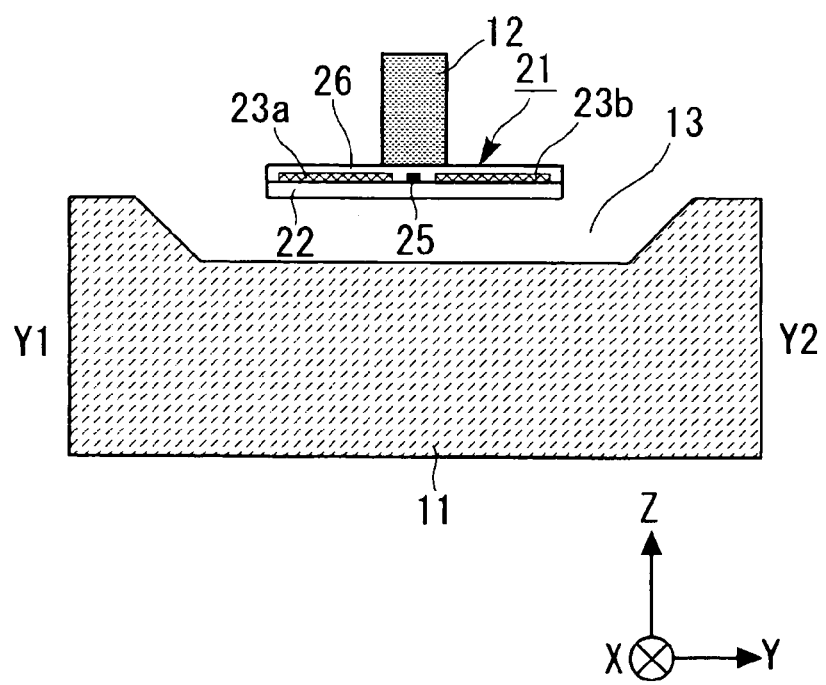
FIG. 4 is a schematic sectional view along line Y1–Y2 in FIG. 2.
Figure 5:
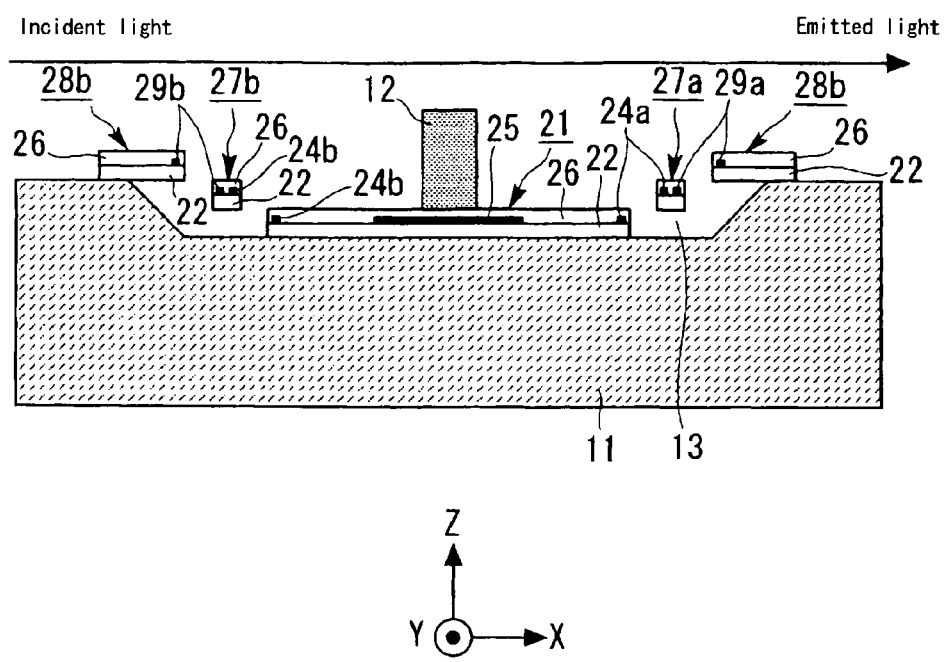
FIG. 5 is a schematic sectional view corresponding to FIG. 3.

Next, the structure of one of the optical switches used as a unit element in the optical switch array 1 shown in FIG. 1 will be described with reference to FIGS. 2 through 5. FIG. 2 is a schematic plan view which shows one optical switch. FIG. 3 is a schematic sectional view along line X1–X2 in FIG. 2. FIG. 4 is a schematic sectional view along line Y1–Y2 in FIG. 2. FIG. 5 is a schematic sectional view corresponding to FIG. 3, and shows a state in which the mirror 12 is held on the lower side. Furthermore, FIG. 3 shows a state in which the mirror 12 is held on the upper side.

Besides the mirror 12 and the substrate 11 used as a fixed part, this optical switch comprises a movable plate 21 used as a movable part which is disposed so that this part can move with respect to the substrate 11. A recessed part 13 constituting a region into which the movable plate 21 advances is formed on the substrate 11. In the present working configuration, a semiconductor substrate such as a silicon substrate is used as the substrate 11, and the portion of the substrate 11 that faces the movable plate 21 constitutes a first electrode part. Of course, it would also be possible to form a first electrode part separately from the substrate 11 by means of a metal film, etc., on the substrate 11.

The movable plate 21 is formed by a thin film, and comprises a lower-side insulating film 22, two second electrode parts 23a and 23b which are formed on the lower-side insulating film 22, portions of wiring patterns 24a and 24b which are formed on the lower-side insulating film 22 and which are respectively used for the electrical connection of the electrode parts 23a and 23b to specified locations on the substrate 11, a coil layer 25 which is formed on the lower-side insulating film 22 and which is used as a current path that is disposed in the magnetic field generated by the magnet 5 shown in FIG. 1 and that generates a Lorentz force when a current is passed through this coil layer, and an upper-side insulating film 26 which covers the upper sides of the elements. The second electrode parts 23a and 23b can generate an electrostatic force between these electrode parts 23a and 23b and the substrate 11 (which constitutes the first electrode part) by means of a voltage that is applied across these electrode parts and the substrate 11.

SiN films or $SiO_2$ films, for example, can be used as the insulating films 22 and 26. Metal films such as Al films, for example, can be used as the electrode parts 23a and 23b, wiring patterns 24a and 24b and coil layer 25. Furthermore, since the electrode parts 23a and 23b, portions of the wiring patterns 24a and 24b and coil layer 25 are covered by the upper-side insulating film 26, these parts should actually be shown by hidden lines in FIG. 2; however, for convenience of graphic illustration, the parts hidden by the upper-side insulating film 26 are also indicated by solid lines. However, the portion of the coil layer 25 that is hidden by the mirror 12 is indicated by hidden lines.

In the present working configuration, both end portions of the movable plate 21 in the direction of the X axis are mechanically connected to the peripheral parts of the recessed part 13 in the substrate 11 via flexure parts 27a and 27b used as spring parts that have spring properties, and anchoring parts 28a and 28b, respectively, in that order. The flexure parts 27a and 27b and anchoring parts 28a and 28b are constructed by the lower-side insulating film 22, the remaining portions of the wiring patterns 24a and 24b, wiring patterns 29a and 29b that are respectively used for the electrical connection of the coil layer 25 to specified locations on the substrate 11, and the upper-side insulating film 26, all of which extend "as is" as continuations of the movable plate 21. Furthermore, the wiring patterns 29a and 29b extend "as is" as continuations of the metal film, etc., constituting the coil layer 25. In the anchoring parts 28a and 28b, the wiring patterns 24a, 24b, 29a and 29b are respectively electrically connected to specified locations on the substrate 11 via holes (not shown in the figures) formed in the lower-side insulating film 22. The wiring patterns 24a and 24b are electrically connected in common by wiring (not shown in the figures) formed on the substrate 11.

As is shown in FIG. 2, the flexure parts 27a and 27b have a meandering shape as seen in a plan view. As a result, the movable plate 21 can move upward and downward (in the direction of the Z axis). Specifically, in the present working configuration, the movable plate 21 can move between an upper position (second position) (see FIGS. 3 and 4) to which the movable plate 21 tends to return by means of spring force (returning force) of the flexure parts 27a and 27b, and a lower position (first position) (see FIG. 5) in which the movable plate 21 advances into the recessed part 13 of the substrate 11 and contacts the bottom part of this recessed part 13. In the upper position shown in FIGS. 3 and 4, the gap between the second electrode parts 23a and 23b of the movable plate 21 and the substrate 11 used as the first electrode part is widened, so that the electrostatic force that can be generated between these parts drops or disappears. In the lower position shown in FIG. 5, the gap between the second electrode parts 23a and 23b of the movable plate 21 and the substrate 11 used as the first electrode part is narrowed, so that the electrostatic force that can be generated between these parts is increased.

The coil layer 25 is disposed so that a Lorentz force can be generated in the direction (downward direction) that moves from the upper position shown in FIGS. 3 and 4 to the lower position shown in FIG. 5, and in the reverse direction (upward direction). In concrete terms, in the present working configuration, since a magnetic field which is oriented toward the – side is generated along the direction of the Y axis by the magnet 5 shown in FIG. 1 as described above, the coil layer 25 is disposed so that this layer extends in the direction of the X axis as shown in FIG. 2 thorough 5.

The mirror 12 is fastened to the upper surface of the movable plate 21 in an upright attitude. As was described above, the orientation of the reflective surface of the mirror 12 is set so that the normal of this reflective surface forms an angle of 45° with the X axis in the plane parallel to the XY plane.

A microactuator which drives the mirror 12 is formed by the constituent elements other than the mirror 12 in the structure of the optical switch described above.

Figure 6:
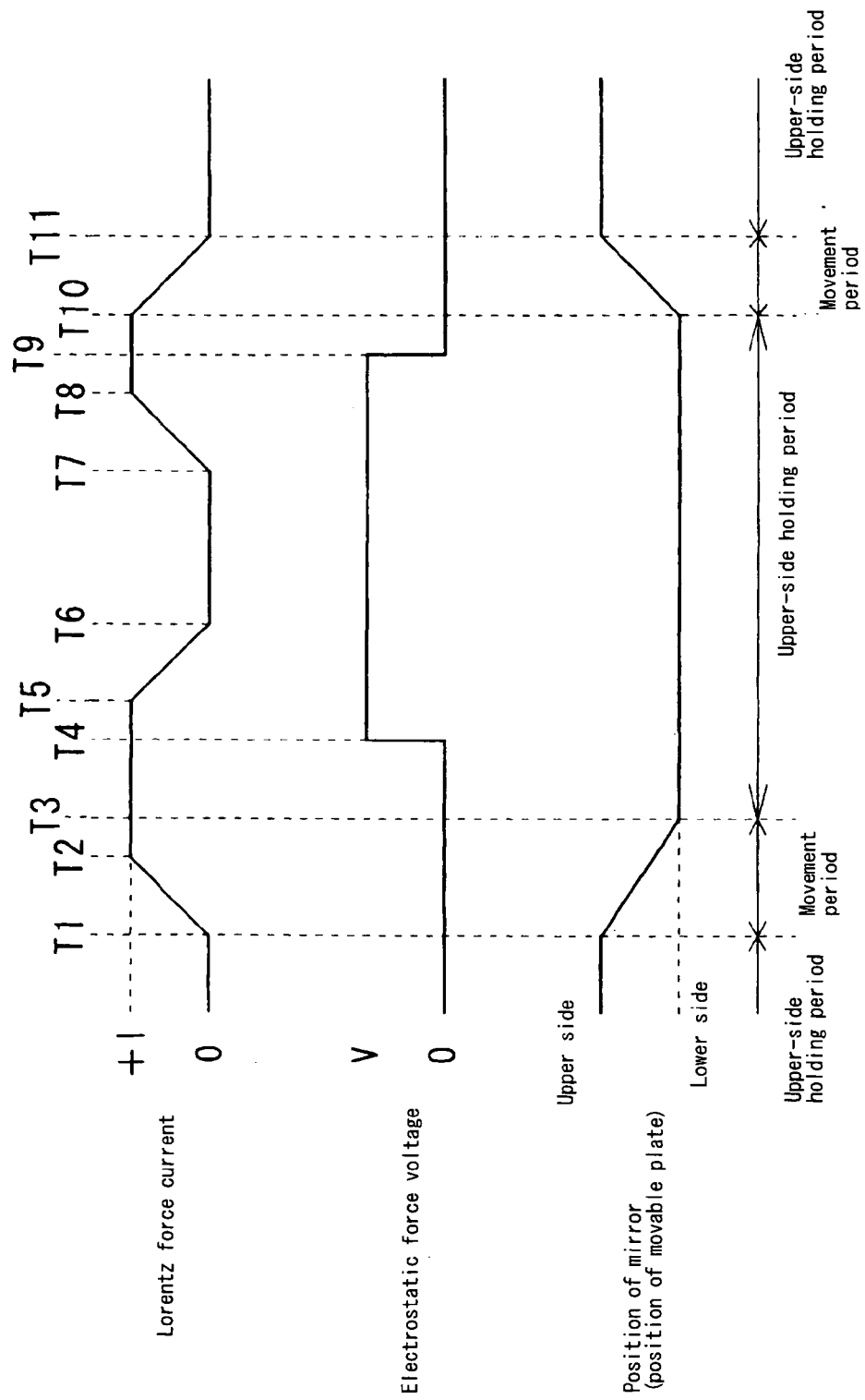
FIG. 6 is a timing chart showing the relationship of the Lorentz force current, the electrostatic force voltage, and the mirror position, arising from the variation over time in one of the optical switches constituting the optical switch array used in the optical switching system shown in FIG. 1.

Next, one example of the control method used, and the operation of the optical switch accomplished by this control method, will be described with reference to FIG. 6, with a focus on a single optical switch. FIG. 6 is a timing chart which shows the relationship (varying over time) of the current that flows through the coil layer 25 of one optical switch to give rise to a Lorentz force (hereafter referred to as the "Lorentz force current"), the voltage that is applied across the first electrode part (substrate 11) of this optical switch and the second electrode parts 23a and 23b of the movable plate 21 to give rise to an electrostatic force between these parts (hereafter referred to as the "electrostatic force voltage"), and the position of the mirror 12 of this optical switch (and accordingly, the position of the movable plate 21).

Initially, it is assumed that the Lorentz force current is zero and that the electrostatic force voltage is zero, so that the mirror 12 is held in the upper position as shown in FIGS. 3 and 4 by the spring force of the flexure parts 27a and 27b. In this state, as is shown in FIG. 3, the incident light is reflected by the mirror 12 and advances toward the front with respect to the plane of the page.

Afterward, at time T1, control is initiated in order to switch the position of the mirror 12 to the lower position shown in FIG. 5. Specifically, the Lorentz force current is caused to begin to flow in the + current direction (the current direction that causes a downward-oriented Lorentz force to be generated) from time T1, and is gradually increased from time T1 to time T2 so that the Lorentz force current at time T2 is +I. Here, +I is a current that generates a downward-oriented Lorentz force in the coil layer 25 that is stronger than the spring force of the flexure parts 27a and 27b.

The mirror 12 is gradually lowered by this Lorentz force, and stops at time T3 at which the movable plate 21 contacts the substrate 11, so that the mirror 12 is held in the lower position shown in FIG. 5.

The mirror 12 does not continue to be held in the lower position by the Lorentz force "as is"; at time T4, the electrostatic force voltage is set at V, after which the Lorentz force current is gradually reduced beginning at time T5, so that the Lorentz force current is reduced to zero. Here, V is a voltage that generates an electrostatic force that is stronger than the spring force of the flexure parts 27a and 27b, at least when the mirror 12 is positioned in the lower position. During the period from T3 to T4, the mirror 12 is held in the lower position by the Lorentz force alone; during the period from T4 to T6, the mirror 12 is held in the lower position by the Lorentz force and the electrostatic force, and from time T6 on, the mirror 12 is held in the lower position by the electrostatic force alone. The period from T3 to T6 is a so-called lower-side holding transition period in which the holding of the mirror 12 in the lower position is switched from the Lorentz force to the electrostatic force, while the period from time T6 on is a so-called steady period of lower-side holding.

During the period in which the mirror 12 is held in the lower position, as is shown in FIG. 5, the incident light passes through "as is" without being reflected by the mirror 12, and constitutes the emitted light.

Subsequently, at time T7, control is initiated in order to switch the position of the mirror 12 to the upper position shown in FIGS. 3 and 4. Specifically, the Lorentz force current is caused to being to flow in the + current direction (the current direction that causes a downward-oriented Lorentz force to be generated), and is gradually increased from time T7 to time T8 so that the Lorentz force current at time T8 is +I. In this case, the electrostatic force between the substrate 11 and the second electrode parts 23a and 23b of the movable part 21 is greater than the force obtained by adding the resulting Lorentz force and the spring force of the flexure parts 27a and 27b; accordingly, the mirror 12 remains held "as is" in the lower position shown in FIG. 5.

Subsequently, after the electrostatic force voltage is reduced to zero at time T9, the Lorentz force current is gradually reduced beginning at time T10, so that the Lorentz force current is reduce to zero at time T11. During the period from T9 to T10, the electrostatic force is zero, but the Lorentz force current is +I. Accordingly, since the downward-oriented Lorentz force that is generated as a result of this is stronger than the spring force of the flexure parts 27a and 27b, the mirror 12 is held in the lower position shown in FIG. 5. From time T10 on, the Lorentz force current gradually decreases; accordingly, the spring force (upward-oriented force) of the flexure parts 27a and 27b becomes greater than the Lorentz force, so that the mirror 12 gradually rises, returns to the upper position shown in FIGS. 3 and 4 (at time T11), and continues to be held in the upper position by the spring force of the flexure parts 27a and 27b.

Thus, when the gap between the second electrode parts 23a and 23b of the movable plate 21 and the substrate 11 (first electrode part) is large, the mirror 12 is moved into the lower position against the spring force of the flexure parts 27a and 27b by a Lorentz force whose magnitude does not depend on the position of the mirror 12 (i.e., the position of the movable plate 21). Accordingly, the mobility range of the movable plate 21 can be expanded without applying a high voltage or sacrificing compact size in order to increase the electrostatic force. Furthermore, in the steady state of holding in the lower position, where the gap between the second electrode parts 23a and 23b of the movable plate 21 and the substrate 11 (first electrode part) narrows, the mirror 12 is held in the lower position by the electrostatic force alone; accordingly, the power consumption can be reduced.

Incidentally, if it is assumed that the Lorentz force current is abruptly reduced to zero at time T10, then only the spring force of the flexure parts 27a and 27b acts from time T10 on; accordingly, since this spring force is relatively large, the mirror 12 rises abruptly upward at time T10, and when the mirror 12 reaches the vicinity of the upper position shown in FIGS. 3 and 4, the mirror 12, etc., is subjected to mechanical stresses as a result of impact or the like, so that the useful life of the mirror is shortened, and so that the reliability in the case of long-term operation drops. In the present working configuration, on the other hand, during the period from T10 to T11, the Lorentz force current that generates a downward-oriented Lorentz force is gradually reduced; consequently, this Lorentz force acts in the manner of a braking force, so that the mirror 12 gradually rises. Accordingly, in this working configuration, the mechanical stress received by the mirror 12 is alleviated, and as a result, the useful life is extended, and the reliability in the case of long-term operation is increased.

Furthermore, if the electrostatic force that is generated when the electrostatic force voltage is set at V is smaller than the spring force of the flexure parts 27a and 27b when the movable plate 21 is positioned in the upper position, then the electrostatic force voltage may also be set at V during the upper-side holding period after the movable plate 21 has moved into the upper position following time T5. The voltage refresh period on the right side in the example shown in FIG. 8 (described later) corresponds to such a case.

Figure 7:
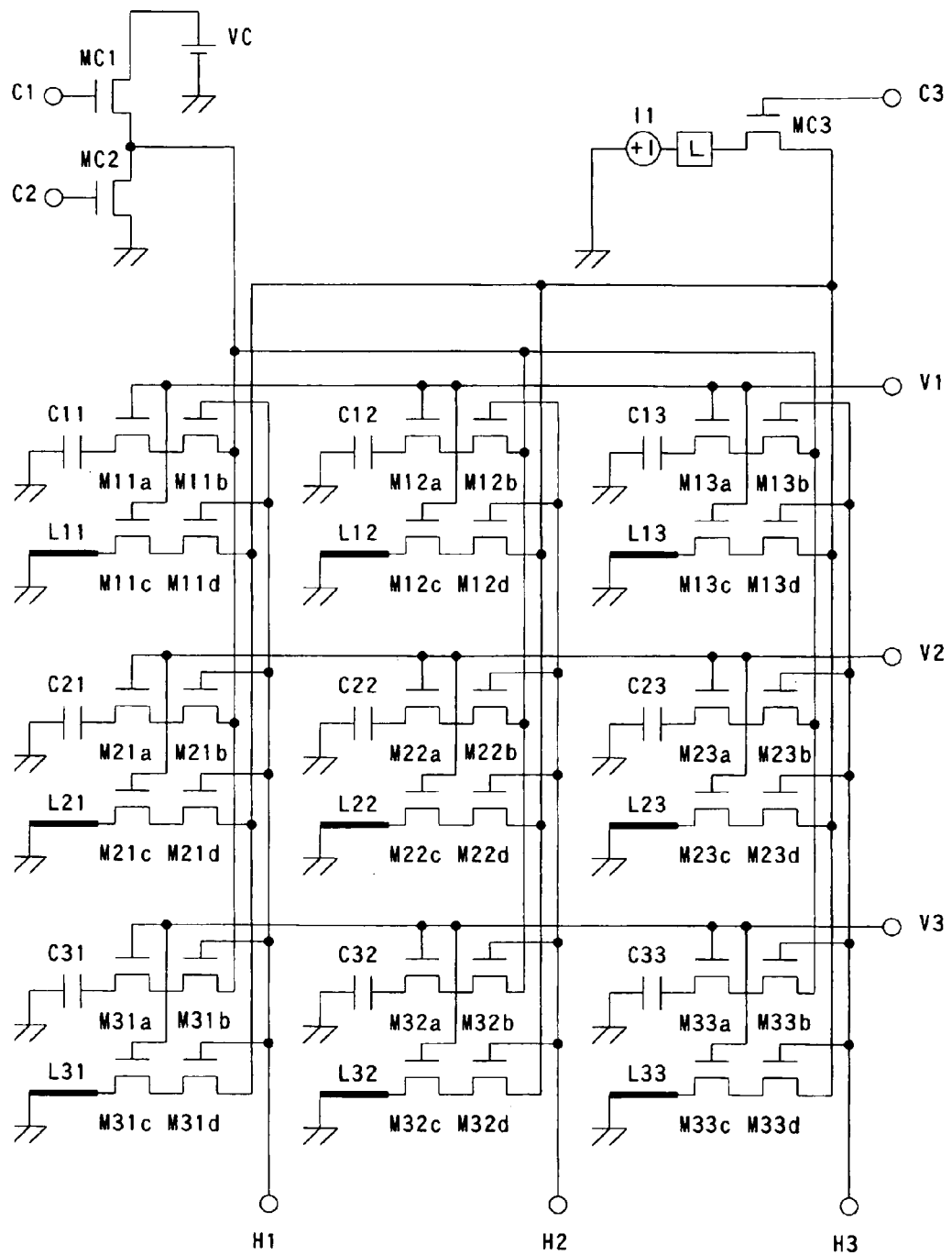
FIG. 7 is an electrical circuit diagram showing the optical switch array used in the optical switching system shown in FIG. 1.

The optical switch array 1 shown in FIG. 1 has a plurality of optical switches of the type shown in FIGS. 2 through 5 as the unit elements described above; these optical switches are disposed in a two-dimensional matrix. Furthermore, the circuit shown in FIG. 7, which contains a plurality of switching elements, is mounted on the optical switch array 1 shown in FIG. 1 in order to realize the control described above for each of these optical switches using a small number of control lines. FIG. 7 is an electrical circuit diagram which shows the optical switch array 1.

In FIG. 7, nine optical switches are disposed in three rows and three columns in order to simplify the description. Of course, there are no restrictions on these numbers; for example, the principle is the same even in a case where there are optical switches disposed in 100 rows and 100 columns.

In terms of the electrical circuit involved, the single optical switch shown in FIGS. 2 through 5 may be viewed as a single capacitor (corresponding to a composite capacitor in which a capacitor formed by the second electrode 23a and first electrode (substrate 11) and a capacitor formed by the second electrode 23b and first electrode (substrate 11) are connected in parallel), and a single coil (corresponding to the coil layer 25). In FIG. 7, the capacitors and coils of the optical switches in m rows and n columns are respectively designated as Cmn and Lmn. For example, the capacitor and coil of the optical switch at the upper left (first row, first column) in FIG. 7 are respectively designated as C11 and L11.

In the circuit shown in FIG. 7, in order to reduce the number of control lines, column selection switches Mmnb and Mmnd and row selection switches Mmna and Mmnc are respectively provided for the capacitors Cmn and coils Lmn. One end of each capacitor Cmn is connected to one end of the corresponding row selection switch Mmna, the other end of this row selection switch Mmna is connected to one end of the corresponding column selection switch Mmnb, and the other end of this column selection switch Mmnb is connected to one end of a voltage control switch MC1 and one end of a voltage control switch MC2. The other end of each capacitor Cmn is connected to ground. The other end of the voltage control switch MC1 is connected to a clamping voltage VC, and the other end of the voltage control switch MC2 is connected to ground.

Furthermore, one end of each coil Lmn is connected to one end of the corresponding row selection switch Mmnc, the other end of this row selection switch Mmnc is connected to one end of the corresponding column selection switch Mmnd, and the other end of this column selection switch Mmnd is connected to one end of a current control switch MC3. The other end of each coil Lmn is connected to ground. The other end of the current control switch MC3 is connected via a coil L to one end of a current source I1 that supplies the current +I, and the other end of the current source I1 is connected to ground. The coil L is disposed so as to realize a gradual increase in the Lorentz force current during the period from T1 to T2 and during the period from T7 to T8 in FIG. 6, and so as to realize a gradual reduction in the Lorentz force current during the period from T5 to T6 and during the period from T10 to T11 in the same figure. This coil L undergoes a current variation with a time constant determined by the product of the reactance and wiring resistance of the coil L; accordingly, a gradual reduction and gradual increase in the Lorentz force current can be realized by increasing the reactance of the coil L to a relatively large value.

The column selection switches Mmnb and Mmnd, row selection switches Mmna and Mmnc, voltage control switches MC1 and MC2 and current control switch MC3 used as switching elements can be constructed, for example, from N-type MOS transistors formed on the substrate 11 in cases where a silicon substrate is used as the substrate 11.

The gates of the row selection switches M11a, M11c, M12a, M12c, M13a and M13c of the first row are connected to a terminal V1. Similarly, the gates of the row selection switches of the second row are connected to a terminal V2, and the gates of the row selection switches of the third row are connected to a terminal V3.

The gates of the column selection switches M11b, M11d, M21b, M21d, M31b and M31d of the first column are connected to a terminal H1. Similarly, the gates of the column selection switches of the second column are connected to a terminal H2, and the gates of the column selection switches of the third column are connected to a terminal H3.

Figure 8:
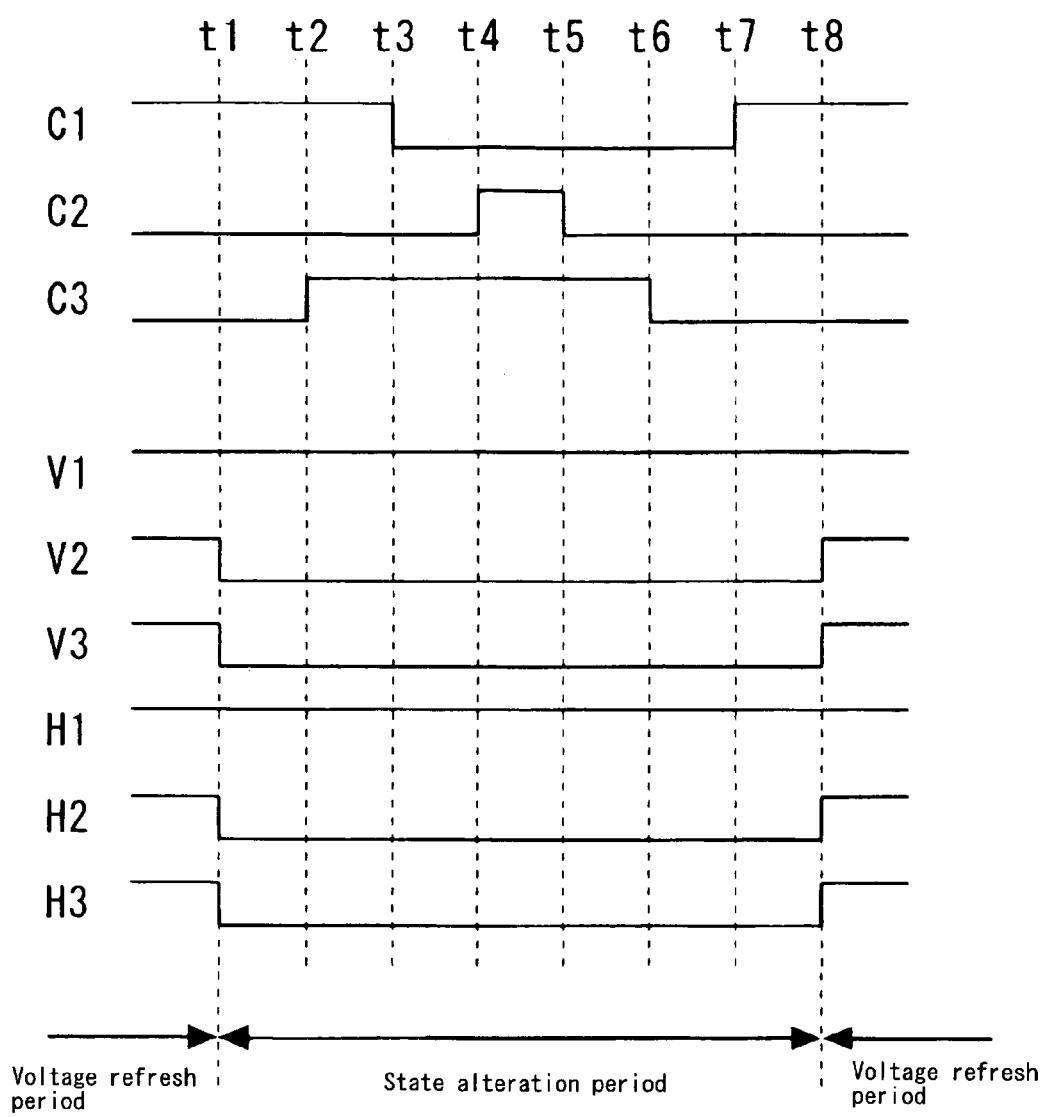
FIG. 8 is a timing chart showing the signals supplied to the respective terminals shown in FIG. 7.

Next, one example of a timing chart of the voltages that are applied to the respective terminals V1, V2, V3, H1, H2, H3, C1, C2 and C3 is shown in FIG. 8. In FIG. 8, the time period prior to time t1 is a voltage refresh period in which the capacitors Cmn of all of the optical switches are biased to a clamping voltage VC. Accordingly, during this period, the terminals V1, V2, V3, H1, H2 and H3 are all at a high level, and all of the column selection switches Mmnb and Mmnd and row selection switches Mmna and Mmnc are in a conductive state. Furthermore, during this period, the terminal C1 is at a high level, and the terminal C2 is at a low level, so that the voltage control switch MC1 is in a conductive state, and the voltage control switch MC2 is in a non-conductive state. Moreover, the terminal C3 is at a low level, so that the current control switch MC3 is in a non-conductive state. During the voltage refresh period, the mirrors 12 are held in either the upper position or the lower position. In the example shown in FIG. 8, the mirrors 12 are held in the lower position during the voltage refresh period prior to time t1.

Incidentally, in the present working configuration, the signals (voltages) that are applied to the terminals V1, V2, V3, H1, H2, H3, C1, C2 and C3 are supplied as control signals from the external control circuit 6 shown in FIG. 1. For example, the external control circuit 6 investigates optical switches whose position state is to be altered from the current position state on the basis of optical path switching state command signals, and successively sets state alteration periods one at a time for each of the optical switches whose state is to be altered. In cases where there are no optical switches whose position state is to be altered from the current position state, the voltage refresh period is set. Furthermore, in cases where a plurality of state alteration periods are set (that is, in cases where the number of optical switches whose position state is to be altered from the current position state is two or greater), voltage refresh periods may be set between the respective state alteration periods, or such voltage refresh periods may be omitted. For example, in a case where the number of optical switches whose position state is to be altered from the current position state is three, a sequence of state alteration period→voltage refresh period→state alteration period→voltage refresh period→state alteration period may be set, or state alteration periods may be continuously set. Furthermore, in the respective set state alteration periods, signals that are applied to the terminals V1, V2, V3, H1, H2, H3, C1, C2 and C3 are supplied so that the control shown in FIG. 6 is realized in accordance with the commanded optical path switching states for the corresponding optical switches. Moreover, it goes without saying that the external control circuit 6 may also be mounted on the optical switch array 1.

FIG. 8 shows an example in which a sequence of voltage refresh period→state alteration period for the optical switch of row 1 column 1→voltage refresh period is set by the external control circuit 6. In the example shown in FIG. 8, the mirror 12 is held in the lower position during the voltage refresh period prior to time t1. At time t1, a state alteration period for the optical switch of row 1 column 1 is initiated, and the terminals V2, V3, H2 and H3 are placed at a low level, so that the capacitors other than the capacitor C11 and the coils other than the coil L11 are isolated. Next, at time t2, the terminal C3 is placed at a high level, so that current begins to flow from the current source I1 to the coil L11. In this case, the current that flows to the coil L11 is gradually increased by the inductance L, so that this current eventually reaches +I. In the present example, time t5 described later is set so that this point in time is the same as or later than the time at which the current reaches +I. Furthermore, time t2 corresponds to time T7 in FIG. 6. Next, at time t3, the terminal C1 is placed at a low level, and at time t4, the terminal C2 is placed at a high level; as a result, the charge charging the capacitor C11 is discharged, so that the electrostatic force voltage is reduced to zero. This time t4 corresponds to time T9 in FIG. 6. Next, at time t5, the terminal C2 is placed at a low level. Subsequently, at time t6, the terminal C3 is placed at a low level; as a result, the current that had been flowing to the coil L11 is gradually reduced from +I, and this current eventually reaches zero. The current that flows to the coil L11 is gradually reduced by the inductance L. This time t6 corresponds to time T10 in FIG. 6. As a result, the mirror 12 gradually rises, and eventually stops and is held in the upper position shown in FIGS. 3 and 4. Subsequently, after the terminal C1 is placed at a high level at time t7, this state alteration period is ended at time t8, and the voltage refresh period is initiated.

Next, one example of the method used to manufacture the optical switch array 1 according to the present working configuration will be described with reference to FIGS. 9 and 10. The respective diagrams shown in FIGS. 9 and 10 are schematic sectional views that illustrate this manufacturing process in model form, and correspond to FIG. 4.

First, MOS transistors (not shown in the figures) that constitute the switches Mmna, Mmnb, Mmnc, Mmnd, MC1, MC2 and MC3 shown in FIG. 7 are formed by an ordinary MOS process on a silicon substrate 31 that is to form the substrate 11. Furthermore, the wiring (not shown in the figures) that is necessary to realize the circuit shown in FIG. 7 is formed on the silicon substrate 31. An $SiO_2$ film 32 is formed on the surface of the substrate 31 in this state. Next, an SiN film 33 that is to form the lower-side insulating film 22 is formed on top of the $SiO_2$ film 32. Furthermore, holes used for connection are formed by a photo-etching method in the $SiO_2$ film 32 and SiN film 33 in locations where the wiring patterns 24a, 24b, 29a and 29b are to be connected to the MOS transistors formed on the substrate 31. An Al film 34 that is to form the electrode parts 23a and 23b, wiring patterns 24a, 24b, 29a and 29b and coil layer 25 is formed by a vapor deposition method, etc., on the substrate 31 in this state; this film is then patterned to form the shapes of these parts by a photo-etching method. Afterward, an SiN film 35 that is to form the upper-side insulating film 26 is formed, and the SiN films 33 and 35 are patterned into the shapes of the movable plate 21, flexure parts 27a and 27b and anchoring parts 28a and 28b by a photo-etching method (FIG. 9(a)).

Next, an $SiO_2$ film 36 is formed on the substrate 31 in the state shown in FIG. 9(a). Then, this film 36 is removed in the location where the mirror 12 is to be formed in the $SiO_2$ film 36, and the $SiO_2$ films 32 and 36 are removed in the locations where etching holes are to be formed in the $SiO_2$ films 32 and 36 (FIG. 9(b)).

Figure 9:
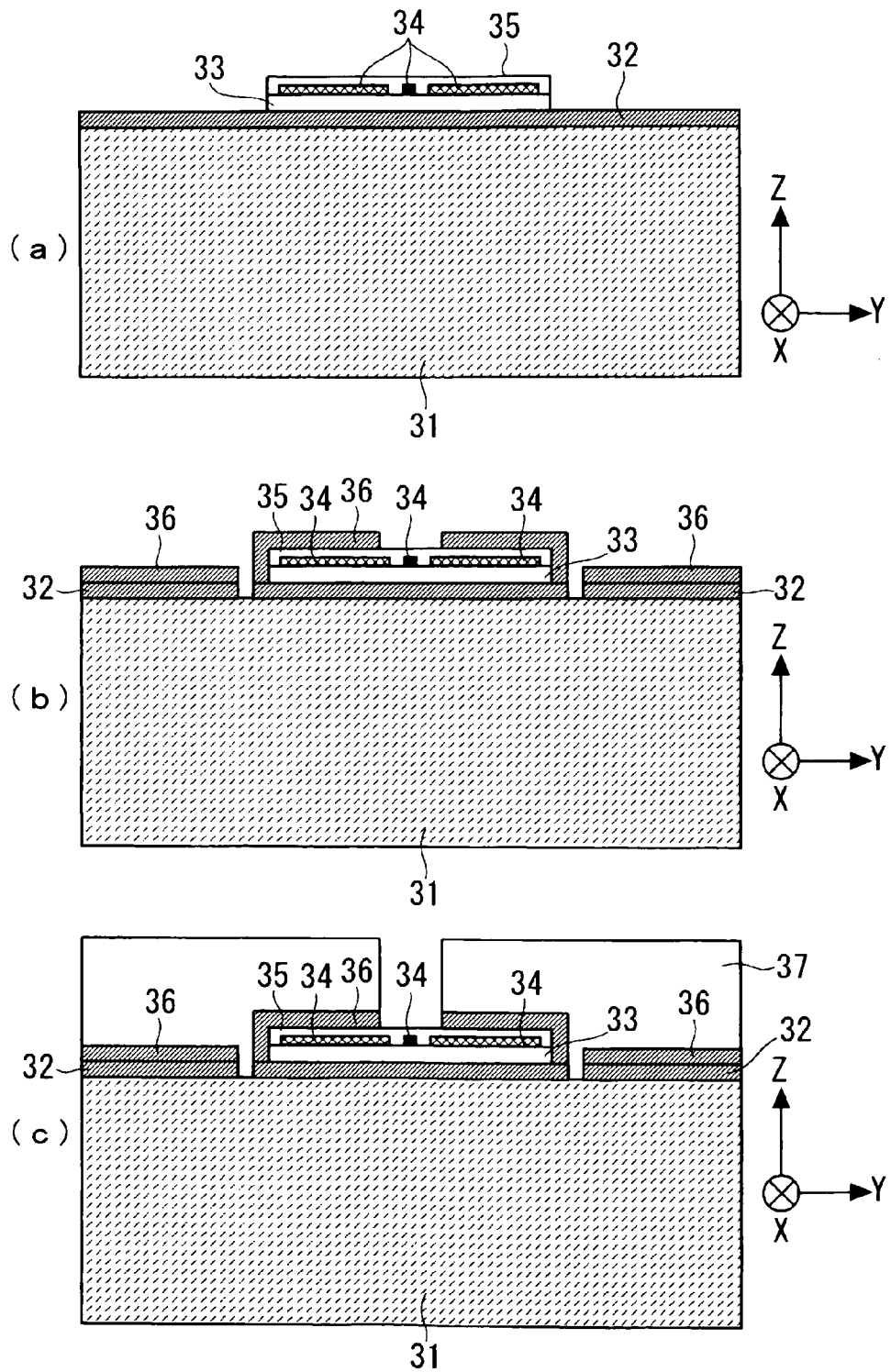
FIG. 9 shows schematic sectional views showing (in model form) the respective manufacturing processes of the optical switch array used in the optical switching system shown in FIG. 1.
Figure 10:
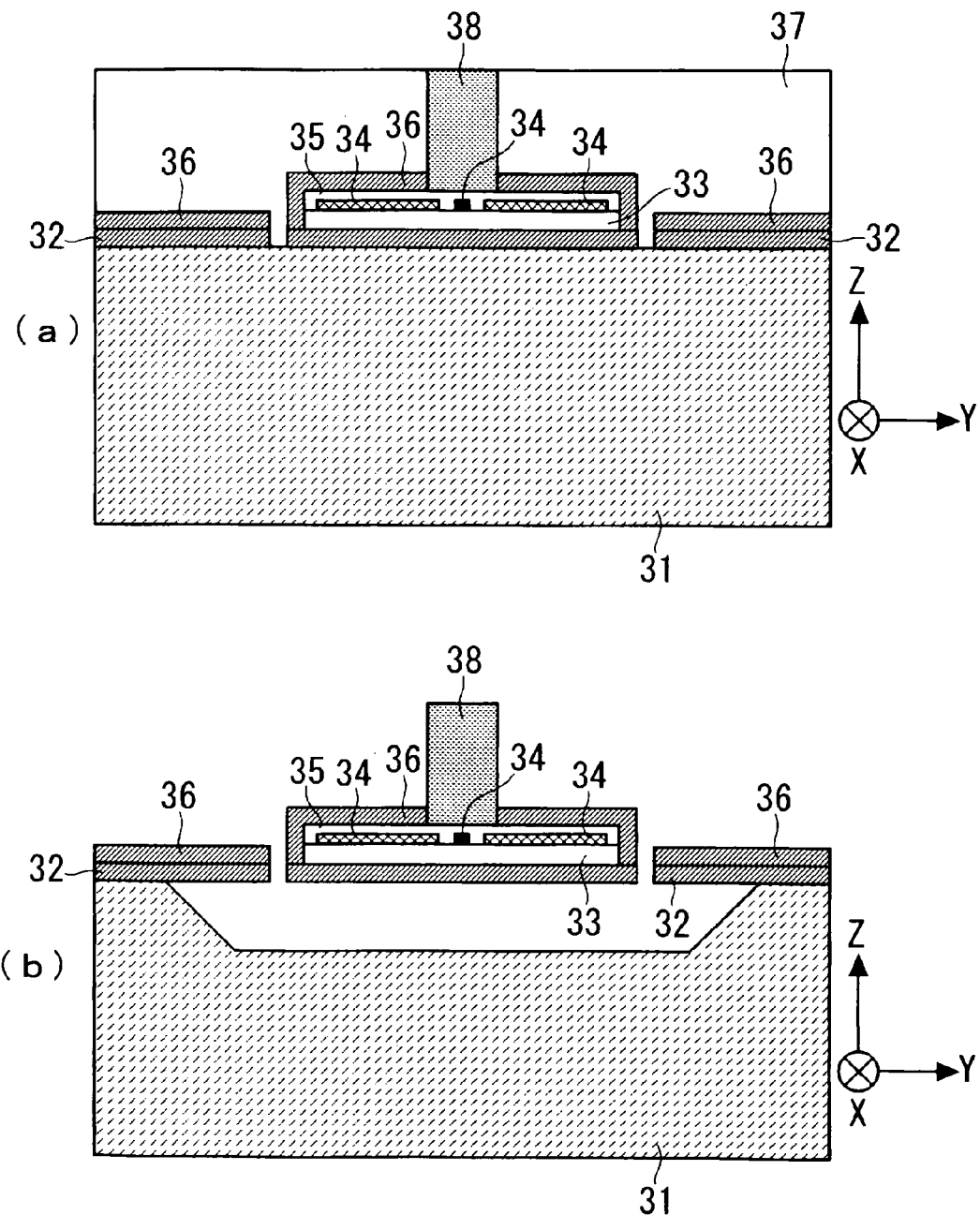
FIG. 10 shows schematic sectional views showing (in model form) other respective manufacturing processes of the optical switch array used in the optical switching system shown in FIG. 1.

Next, the substrate in the state shown in FIG. 9(b) is thickly coated with a resist 37. Here, the resist 37 is exposed and developed so that a region where the mirror 12 is grown is formed in the resist 37 (FIG. 9 (c)). Subsequently, Au, Ni or some other metal 38 that is to form the mirror 12 is grown by electroplating (FIG. 10(a)).

Next, after the resist 37 has been removed, a KOH solution is injected via the etching holes, and portions of the substrate 31 are removed (FIG. 10(b)). Finally, the remaining $SiO_2$ films 32 and 36 are removed. As a result, the optical switch array 1 according to the present working configuration is completed.

In the present working configuration, as was described above, since the electrostatic force and Lorentz force are cleverly utilized, the mobility range of the movable part can be expanded without applying a high voltage or sacrificing compact size, and the power consumption can be reduced.

Furthermore, in the present working configuration, as was described above, when the mirror 12 moves from the lower position shown in FIG. 5 to the upper position shown in FIGS. 3 and 4, the Lorentz force current that generates a downward-oriented Lorentz force is gradually reduced; accordingly, the mechanical stress received by the mirror 12, etc., is alleviated, and as a result, the useful life is extended, and the reliability in the case of long-term operation is increased.

[Second Working Configuration]

The optical switching system according to a second working configuration of the present invention is a system in which the optical switching system according to the first working configuration is modified as described below. In all respects other than those described below, this working configuration is constructed in the same manner as the first working configuration; accordingly, a redundant description is omitted.

Figure 11:
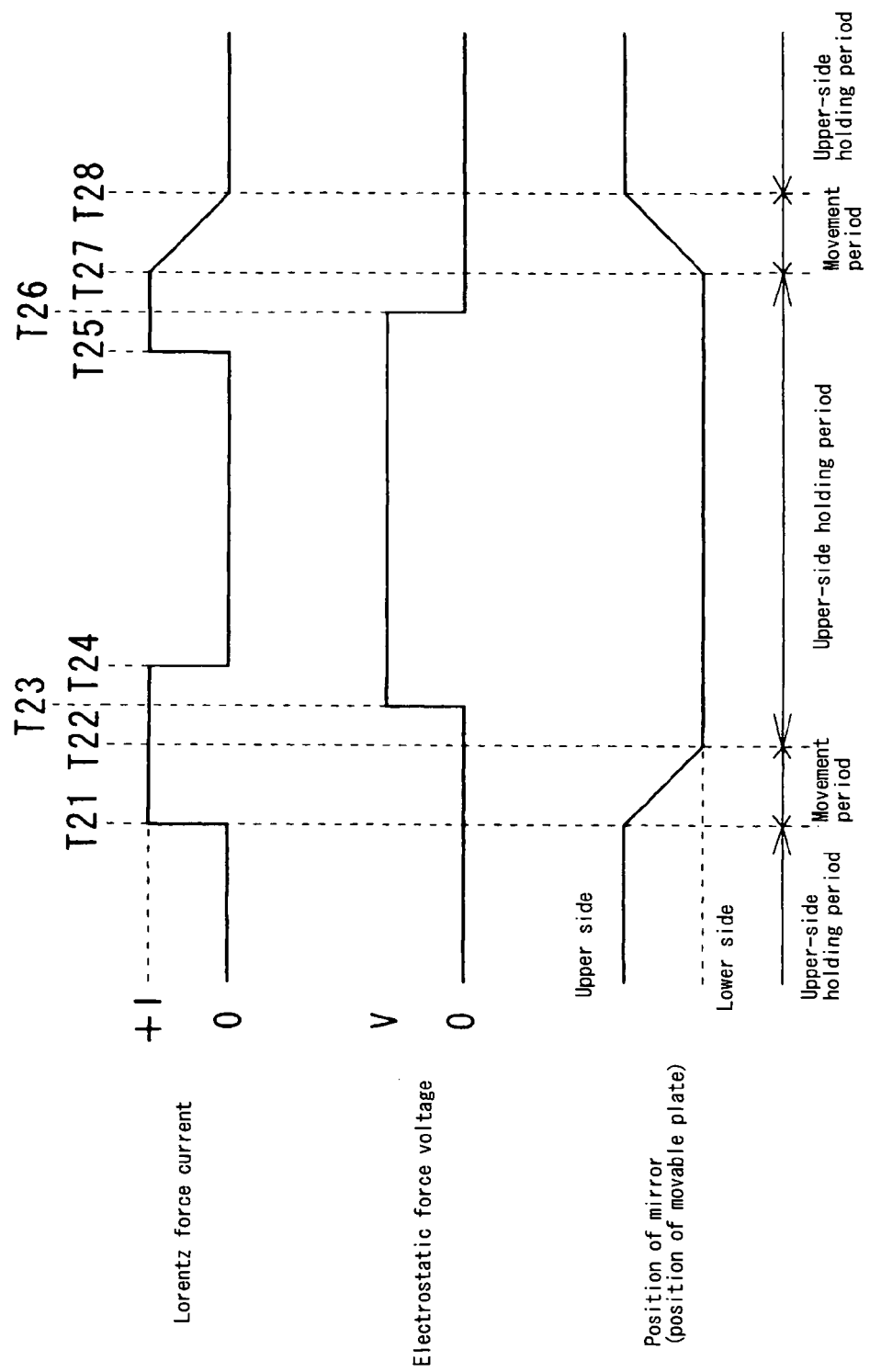
FIG. 11 is a timing chart showing the control and operation of one of the optical switches constituting the optical switch array used in an optical switching system constituting a second working configuration of the present invention.

In the present working configuration, the control shown in FIG. 11 is performed instead of the control shown in FIG. 6 for the respective optical switches. The control shown in FIG. 11 differs as follows from the control shown in FIG. 6: namely, in the control shown in FIG. 6, the Lorentz force current is caused to increase gradually during the period from T1 to T2 and during the period from T7 to T8, and the Lorentz force current is caused to decrease gradually during the period from T5 to T6. In the control shown in FIG. 11, on the other hand, the Lorentz force current is caused to rise abruptly to +I at time T21 (corresponding to time T1 in FIG. 6) and at time T25 (corresponding to time T7 in FIG. 6), and the Lorentz force current is caused to fall abruptly to zero at time T24 (corresponding to time T5 in FIG. 6). In all other respects, the control shown in FIG. 11 is the same as the control shown in FIG. 6; accordingly, a description of such control is omitted. Furthermore, the points in time T22, T23, T26, T27 and T28 in FIG. 11 respectively correspond to the points in time T3, T4, T9, T10 and T11 in FIG. 6.

Figure 12:
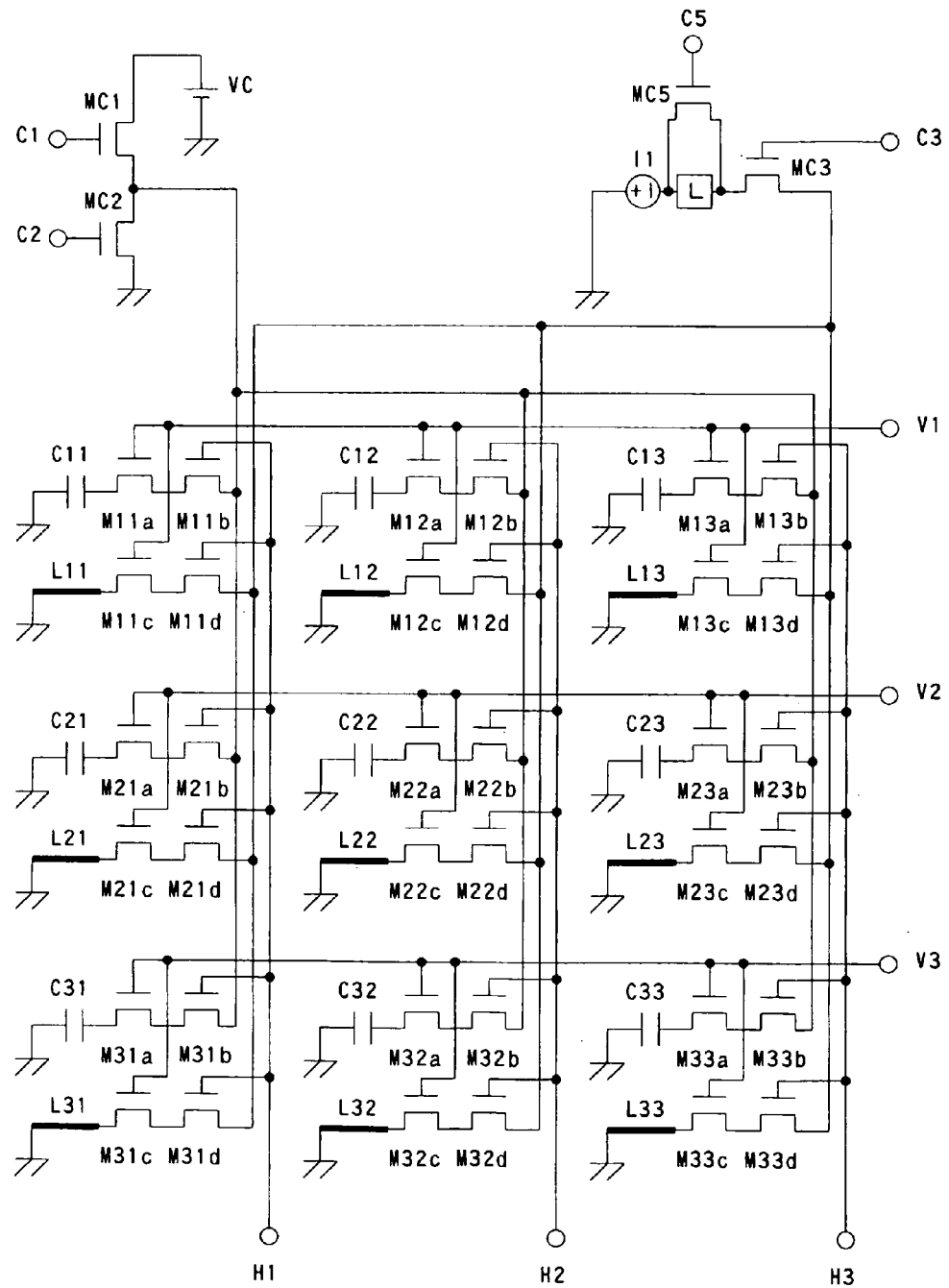
FIG. 12 is an electrical circuit diagram showing the optical switch array used in the optical switching system constituting a second working configuration of the present invention.

Furthermore, in the present working configuration, the circuit shown in FIG. 12 is mounted on the optical switch array 1 instead of the circuit shown in FIG. 7. FIG. 12 is an electrical circuit diagram showing the optical switch array 1 used in the present working configuration. In FIG. 12, elements that are the same as elements shown in FIG. 7, or that correspond to such elements, are labeled with the same symbols, and a redundant description is omitted.

The circuit shown in FIG. 12 differs from the circuit shown in FIG. 7 only in the following respects: namely, a control switch MC5 consisting of an N-type MOS transistor or the like that can shunt the coil L is added, and the terminal C5 is connected to the gate of this control switch MC5. It is possible to select whether the coil L is to be enabled or disabled according to whether the terminal C5 is placed at a high level or a low level; accordingly, a selection can be made as to whether the variation in the current for the coil Lmn is made abrupt or gradual.

In the present working configuration, the signals (voltages) that are applied to the terminals V1, V2, V3, H1, H2, H3, C1, C2, C3 and C5 are supplied as control signals from an external control circuit corresponding to the external control circuit 6 shown in FIG. 1. Like the external control circuit 6 shown in FIG. 1, this external control circuit investigates optical switches whose position state is to be altered from the current position state, for example, on the basis of optical path switching state command signals, and successively sets state alteration periods one at a time for each of the optical switches whose state is to be altered. In cases where there are no optical switches whose position state is to be altered from the current position state, the voltage refresh period is set. Furthermore, in cases where a plurality of state alteration periods are set (that is, in cases where the number of optical switches whose position state is to be altered from the current position state is two or greater), voltage refresh periods may be set between the respective state alteration periods, or such voltage refresh periods may be omitted. For example, in a case where the number of optical switches whose position state is to be altered from the current position state is three, a sequence of state alteration period→voltage refresh period→state alteration period→voltage refresh period →state alteration period may be set, or state alteration periods may be continuously set. Furthermore, in the respective set state alteration periods, signals that are applied to the terminals V1, V2, V3, H1, H2, H3, C1, C2, C3 and C5 are supplied so that the control shown in FIG. 11 is realized in accordance with the commanded optical path switching states for the corresponding optical switches. Moreover, it goes without saying that this external control circuit may also be mounted on the optical switch array 1.

Figure 13:
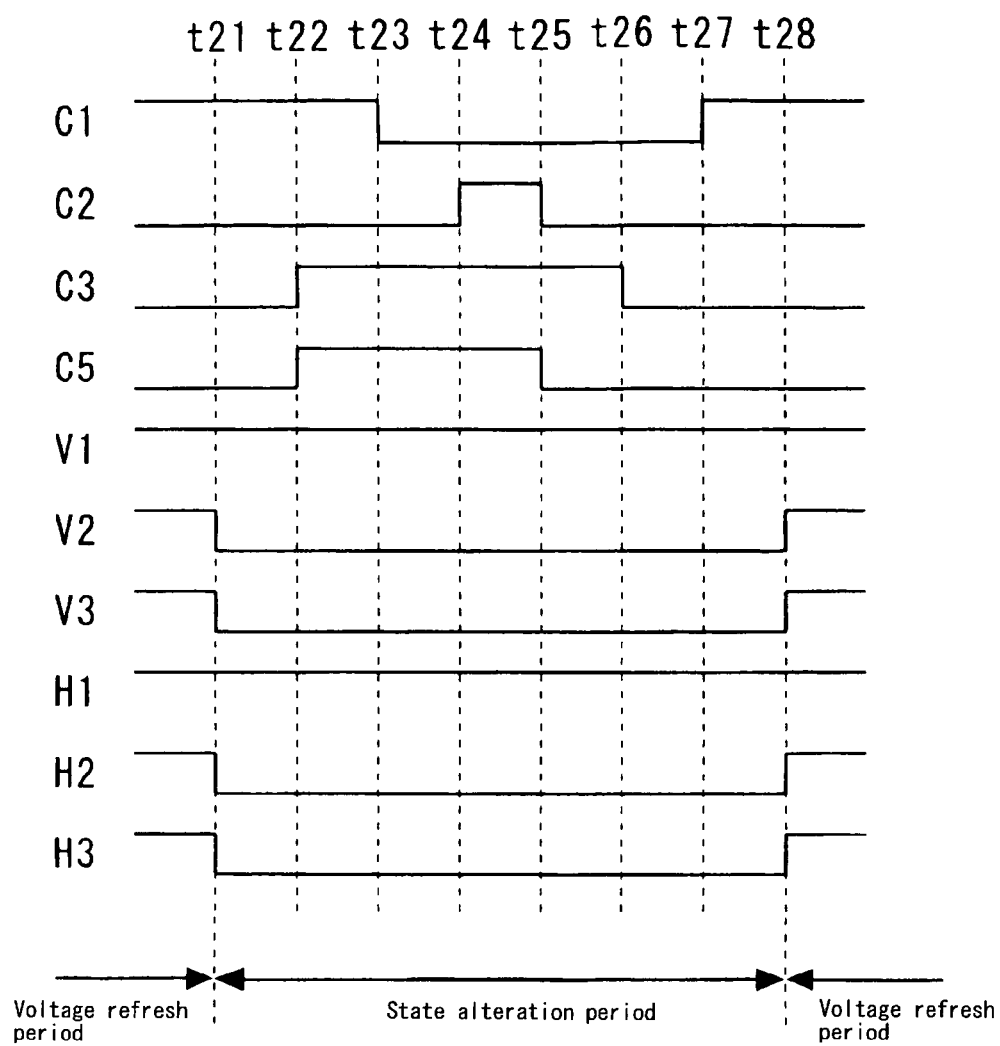
FIG. 13 is a timing chart showing the signals supplied to the respective terminals shown in FIG. 12.

FIG. 13 shows an example in which a sequence of voltage refresh period→state alteration period for the optical switch of row 1 column 1→voltage refresh period is set by this external control circuit. In the example shown in FIG. 13, during the voltage refresh period prior to time t21, the mirror 12 is held in the lower position. At time t21, a state alteration period is initiated for the optical switch of row 1 column 1; the terminals V2, V3, H2 and H3 are placed at a low level, so that the capacitors other than the capacitor C11 and the coils other than the coil L11 are isolated. Next, at time t22, the terminal C3 is placed at a high level, and at the same time, the terminal C5 is placed at a high level, so that the control switch MC5 is placed in a conductive state; as a result, a current +I abruptly flows to the coil L11. This time 22 corresponds to time T25 in FIG. 11. Next, at time t23, the terminal C1 is placed at a low level, and at time t24, the terminal C2 is placed at a high level; as a result, the charge charging the capacitor C1 is discharged, so that the electrostatic force voltage is reduced to zero. This time t24 corresponds to time T26 in FIG. 11. Next, at time t25, the terminal C2 is placed at a low level, and the terminal C5 is placed at a low level. Subsequently, at time t26, the terminal C3 is placed at a low level; as a result, the current that flows to the coil L11 is gradually reduced from +I, and eventually this current becomes zero. In this case, since the terminal C5 is placed at a low level, and the control switch MC5 is in a non-conductive state, the coil L is enabled; accordingly, the current that flows to the coil L11 is gradually reduced. This time t26 corresponds to time T27 in FIG. 6. As a result, the mirror 12 gradually rises, and eventually stops and is held in the upper position shown in FIGS. 3 and 4. Subsequently, after the terminal C1 has been placed at a high level at time t27, this state alteration period is ended at time t28, and a voltage refresh period is initiated.

The state alteration period shown in FIG. 13 was a period in which the mirror 12 held on the lower side was altered to the upper position. Conversely, however, in the state alteration period in which the mirror 12 held on the upper side is altered to the lower position, an abrupt rise and fall in the Lorentz force current such as those shown in FIG. 11 can be realized by simultaneously placing the terminals C3 and C5 at a high level at a point in time corresponding to time T21 in FIG. 11, placing the terminal [C]3 at a low level at a point in time corresponding to time T24 in FIG. 11, and placing the terminal C5 at a low level after a specified time has elapsed from this point in time.

In the present working configuration, advantages similar to those of the first working configuration are obtained; in addition, since the Lorentz force current is abruptly raised to +I at T21 in FIG. 11, the movement time that is required when the mirror 12 is moved from the upper position to the lower position can be shortened, so that the operating speed can be correspondingly increased.

[Third Working Configuration]

The optical switching system according to a third working configuration of the present invention is a system in which the optical switching system according to the first working configuration is modified as described below. In all respects other than those described below, this working configuration is constructed in the same manner as the first working configuration; accordingly, a redundant description is omitted.

Figure 14:
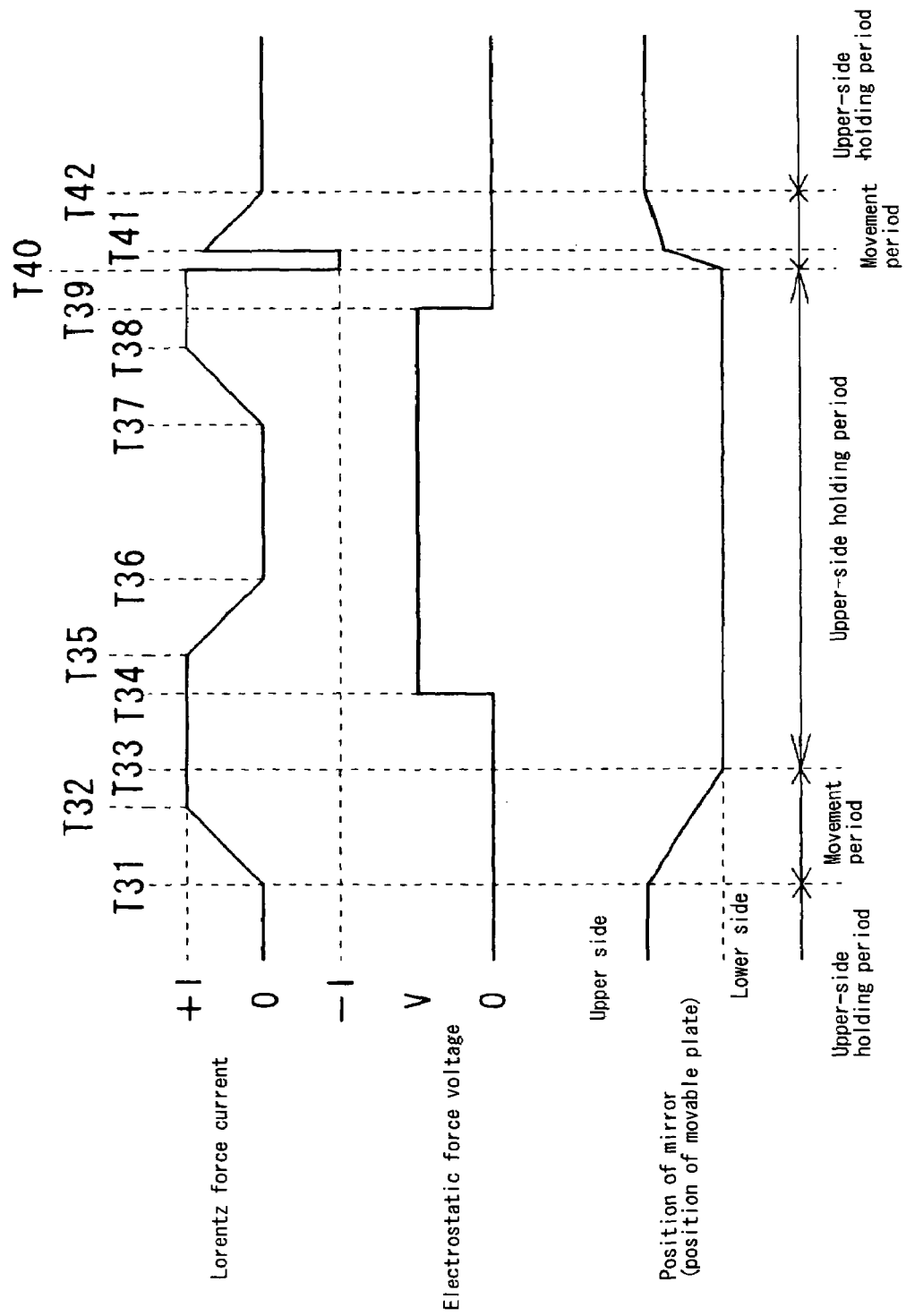
FIG. 14 is a timing chart showing the control and operation of one of the optical switches constituting the optical switch array used in an optical switching system constituting a third working configuration of the present invention.

In the present working configuration, the control shown in FIG. 14 is performed instead of the control shown in FIG. 6 for the respective optical switches. The control shown in FIG. 14 differs as follows from the control shown in FIG. 6: namely, in the control shown in FIG. 6, the Lorentz force current is simply caused to decrease gradually from +I to zero during the period from T10 to T11. In the control shown in FIG. 14, on the other hand, −I (a current that generates an upward-oriented Lorentz force in the coil layer 25) is caused to flow as a Lorentz force current during the period extending from time T40 (corresponding to time T10 in FIG. 6) to time T41, and a current that is gradually reduced from substantially +I to zero is caused to flow as the Lorentz force current during the period extending from time T41 to time T42 (corresponding to time T11 in FIG. 6). In all other respects, the control shown in FIG. 14 is also the same as the control shown in FIG. 6; accordingly, a description of such control is omitted. Furthermore, the points in time T31 through T40 and T42 in FIG. 14 respectively correspond to the points in time T1 through T11 in FIG. 6.

Accordingly, in the present working configuration, when the mirror 12 moves from the lower position shown in FIG. 5 to the upper position shown in FIGS. 3 and 4, an upward-oriented Lorentz force is applied in the initial period T40 to T41 of this movement. Consequently, this Lorentz force increases the upward-oriented force and acts in the manner of an accelerating force. Accordingly, the movement speed of the mirror 12 is increased, so that the mirror can be caused to move to the upper position in a shorter time. Furthermore, when the mirror 12 is held in the lower position, even in cases where the phenomenon known as sticking occurs between the contact parts of the movable plate 21 and the substrate 11 so that an adhesive force acts between these two parts, a large upward-oriented force is applied to the movable plate 21 during the initial period T40 to T41 of movement; accordingly, both parts are easily peeled apart, so that there is no danger of operational failure.

Furthermore, in the present working configuration, when the mirror 12 moves from the lower position shown in FIG. 5 to the upper position shown in FIGS. 3 and 4, a Lorentz force current of substantially +I to zero (i.e., a current that generates a downward-oriented Lorentz force) flows during the period from T41 to T42 preceding the end of this movement; consequently, this Lorentz force acts in the manner of a braking force, so that the mirror 12 rises gently. Accordingly, in the present working configuration, as in the first working configuration, the mechanical stress received by the mirror 12 and the like is alleviated, and as a result, the useful life is extended, and the reliability in the case of long-term operation is increased.

Figure 15:
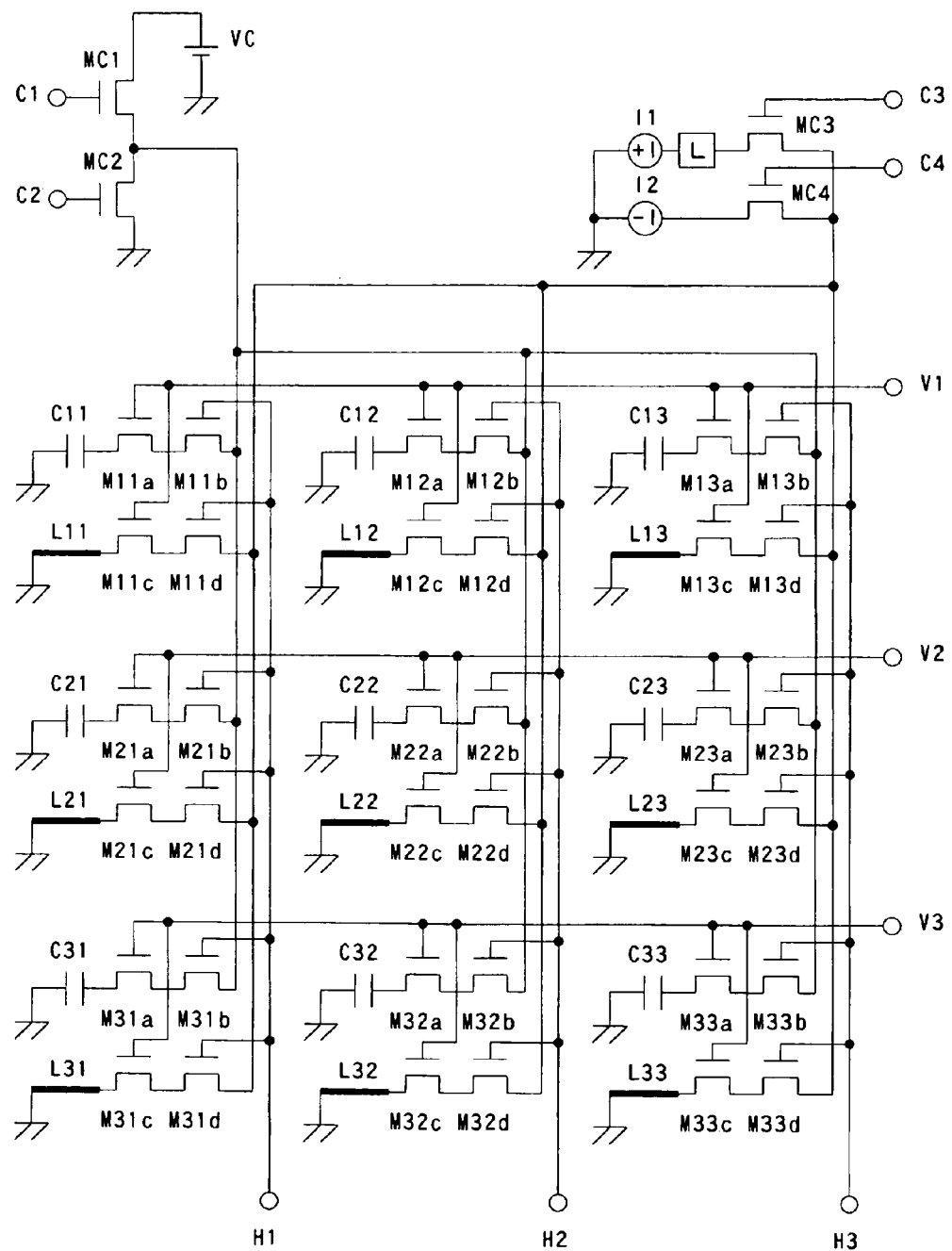
FIG. 15 is an electrical circuit diagram showing the optical switch array used in an optical switching system constituting third and fourth working configurations of the present invention.

In the present working configuration, the circuit shown in FIG. 15 is mounted on the optical switch array 1 instead of the circuit shown in FIG. 7. FIG. 15 is an electrical circuit diagram showing the optical switch array 1 used in the present working configuration. In FIG. 15, elements that are the same as elements shown in FIG. 7, or that correspond to such elements, are labeled with the same symbols, and a redundant description is omitted.

The circuit shown in FIG. 15 differs from the circuit shown in FIG. 7 in that a current control switch MC4 and a current source I2 that supplies the current −I are added. One end of the current control switch MC4 is connected to the other end of the column selection switch Mmnd, and the other and of the current control switch MC4 is connected to one end of the current source I2; furthermore, the other end of the current source I2 is connected to ground. The gate of the current control switch MC4 is connected to the terminal C4.

In the present working configuration, the signals (voltages) that are applied to the terminals V1, V2, V3, H1, H2, H3, C1, C2, C3 and C4 are supplied as control signals from an external control circuit corresponding to the external control circuit 6 shown in FIG. 1. Like the external control circuit 6 shown in FIG. 1, this external control circuit investigates optical switches whose position state is to be altered from the current position state, for example, on the basis of optical path switching state command signals, and successively sets state alteration periods one at a time for each of the optical switches whose state is to be altered. In cases where there are no optical switches whose position state is to be altered from the current position state, the voltage refresh period is set. Furthermore, in cases where a plurality of state alteration periods are set (that is, in cases where the number of optical switches whose position state is to be altered from the current position state is two or greater), voltage refresh periods may be set between the respective state alteration periods, or such voltage refresh periods may be omitted. For example, in a case where the number of optical switches whose position state is to be altered from the current position state is three, a sequence of state alteration period→voltage refresh period→state alteration period→voltage refresh period →state alteration period may be set, or state alteration periods may be continuously set. Furthermore, in the respective set state alteration periods, signals that are applied to the terminals V1, V2, V3, H1, H2, H3, C1, C2, C3 and C4 are supplied so that the control shown in FIG. 14 is realized in accordance with the commanded optical path switching states for the corresponding optical switches. Moreover, it goes without saying that this external control circuit may also be mounted on the optical switch array 1.

Figure 16:
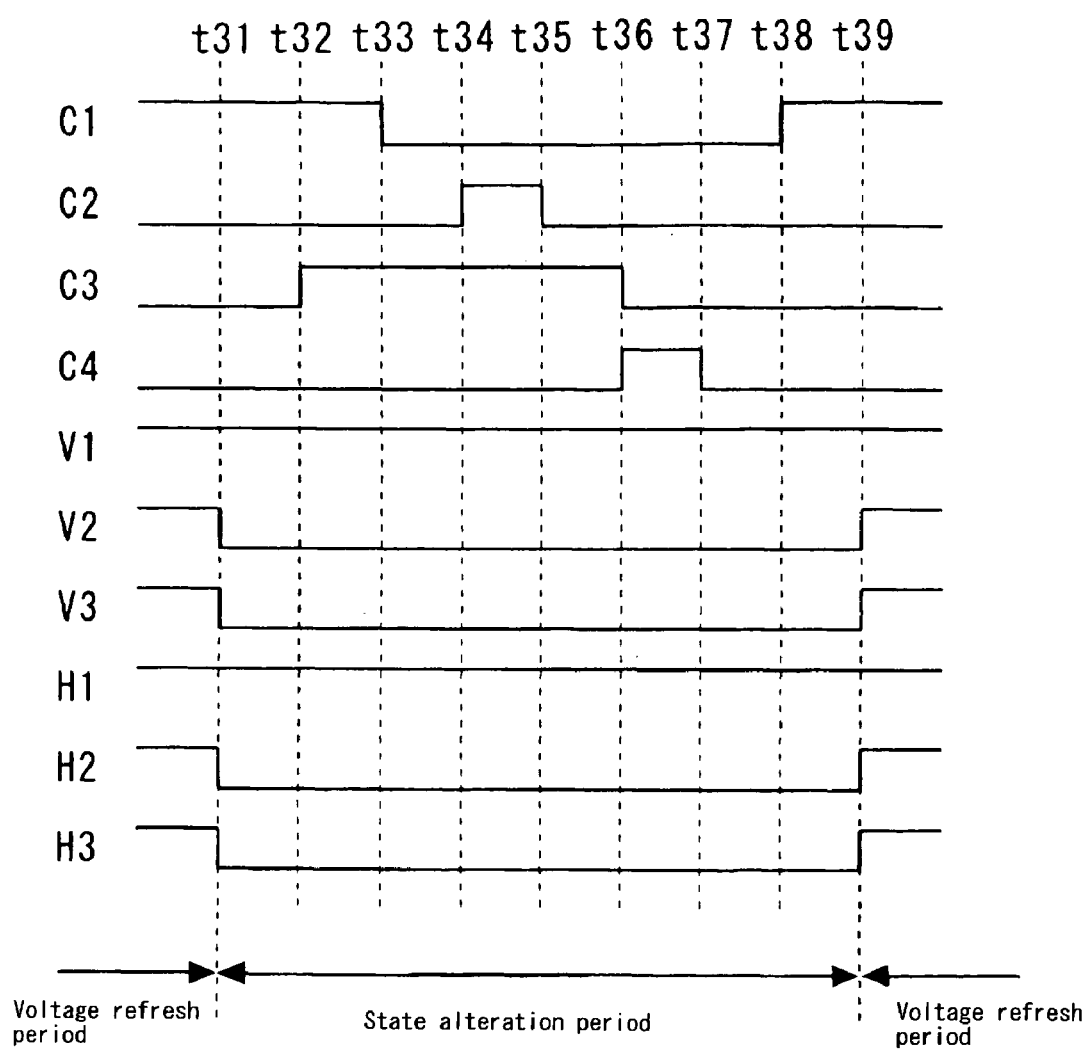
FIG. 16 is a timing chart showing the signals supplied to the respective terminals shown in FIG. 15.

FIG. 16 shows an example in which a sequence of voltage refresh period→state alteration period for the optical switch of row 1 column 1→voltage refresh period is set by this external control circuit. In the example shown in FIG. 16, during the voltage refresh period prior to time t31, the mirror 12 is held in the lower position. At time t31, a state alteration period is initiated for the optical switch of row 1 column 1; the terminals V2, V3, H2 and H3 are placed at a low level, so that the capacitors other than the capacitor C11 and the coils other than the coil L11 are isolated. Next, at time t32, the terminal C3 is placed at a high level, so that current begins to flow from the current source I1 to the coil L11. In this case, the current that flows to the coil L11 is gradually increased by the inductance L, so that this current eventually reaches +I. In the present example, time t35 described later is set so that this point in time is the same as or later than the time at which the current reaches +I. Furthermore, time t32 corresponds to time T37 in FIG. 14. Next, at time t33, the terminal C1 is placed at a low level, and at time t34, the terminal C2 is placed at a high level; as a result, the charge charging the capacitor C11 is discharged, so that the electrostatic force voltage is reduced to zero. This time t34 corresponds to time T39 in FIG. 14. Next, at time t35, the terminal C2 is placed at a low level. Subsequently, at time t36, the terminal C3 is placed at a low level, and at the same time, the terminal C4 is placed at a high level; as a result, a current −I flows to the coil L11. In this case, the state remains a state in which energy has accumulated in the coil L. Furthermore, time t36 corresponds to time T40 in FIG. 14. Next, at time t37, the terminal C4 is placed at a low level, and the current control switch MC4 is placed in a non-conductive state; as a result, substantially +I is caused to flow to the coil [L]11 by the energy that has accumulated in the coil L, and subsequently, this current gradually decreases from substantially +I to zero. Time t37 corresponds to time T41 in FIG. 14. As a result, the mirror 12 moves into the upper position shown in FIGS. 3 and 4 and stops, so that this position is maintained. Subsequently, after the terminal C1 is placed at a high level at time t38, this state alteration period is ended at time t39, and a voltage refresh period is initiated.

In the present working configuration, as was described above, advantages similar to those of the first working configuration are obtained; in addition, the operating speed when the mirror 12 moves from the lower position to the upper position is increased, and even if sticking occurs, there is no danger of operational failure.

[Fourth Working Configuration]

The optical switching system according to a fourth working configuration of the present invention is a system in which the optical switching system according to the first working configuration is modified as described below. In all respects other than those described below, this working configuration is constructed in the same manner as the first working configuration; accordingly, a redundant description is omitted.

Figure 17:
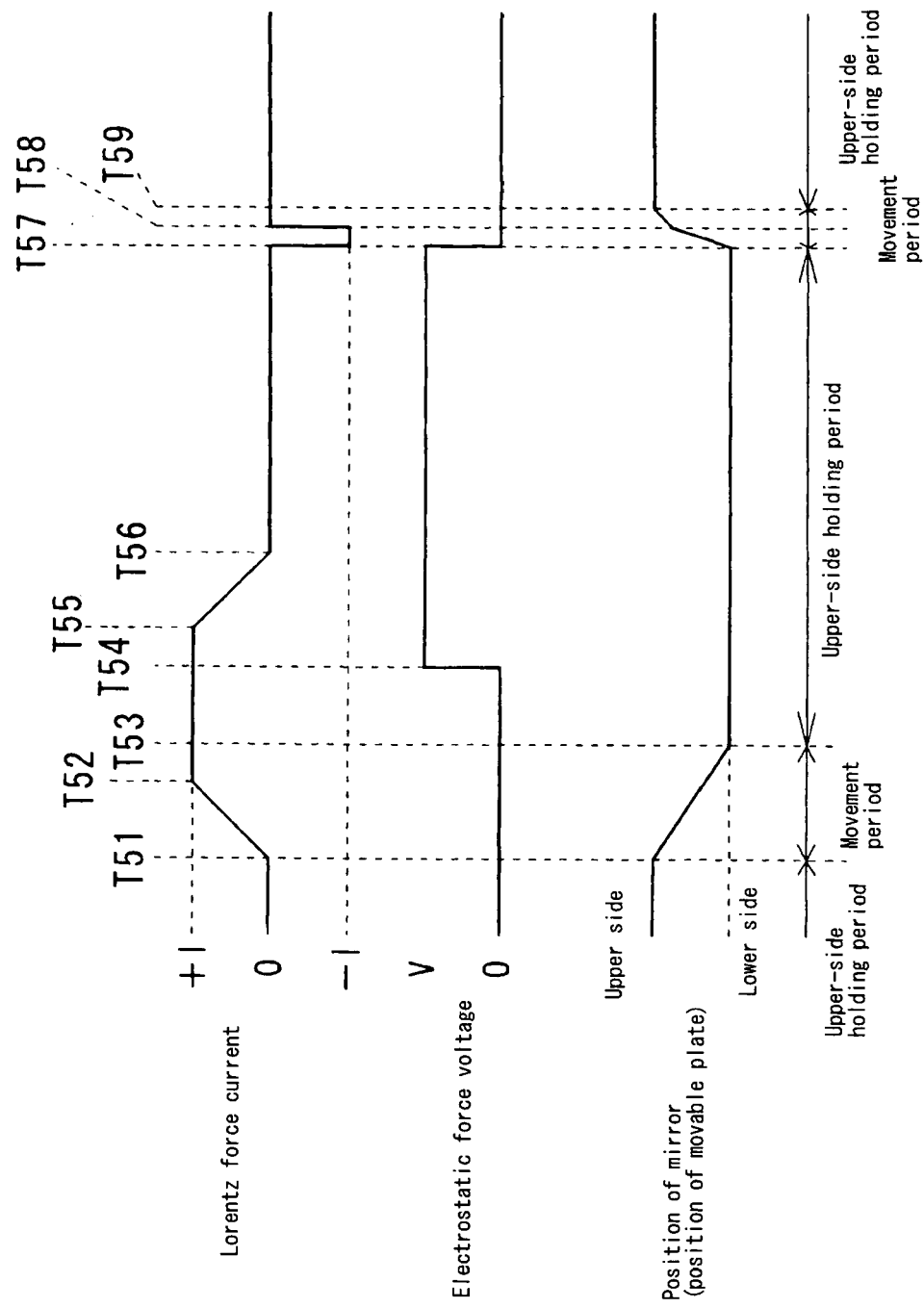
FIG. 17 is a timing chart showing the control and operation of one of the optical switches constituting the optical switch array used in an optical switching system constituting a fourth working configuration of the present invention.

In the present working configuration, the control shown in FIG. 17 is performed instead of the control shown in FIG. 6 for the respective optical switches. The control shown in FIG. 17 differs from the control shown in FIG. 6 as follows: namely, in the control shown in FIG. 6, when the mirror 12 is caused to move from the lower position to the upper position, a Lorentz force current that generates an upward-oriented Lorentz force in the coil layer 25 flows during the period from T7 to T11; on the other hand, in the control shown in FIG. 17, when the mirror 12 is caused to move from the lower position to the upper position, there is no flow of a Lorentz force current that generates a downward-oriented Lorentz force in the coil layer 25, and −I (a current that generates an upward-oriented Lorentz force in the coil layer 25) is caused to flow as a Lorentz force current during the period extending from time T57 (corresponding to time T9 in FIG. 6) to time T58. Time T58 is the time at which the mirror 12 is positioned in an intermediate position in the movement from the lower position to the upper position. In all other respects, the control shown in FIG. 17 is also the same as the control shown in FIG. 6; accordingly, a description of such control is omitted. Furthermore, the points in time T51 through T56 in FIG. 17 respectively correspond to the points in time T1 through T6 in FIG. 6.

Accordingly, in the present working configuration, when the mirror 12 moves from the lower position shown in FIG. 5 to the upper position shown in FIGS. 3 and 4, an upward-oriented Lorentz force is applied in the initial period T57 to T58 of this movement. Consequently, this Lorentz force increases the upward-oriented force and acts in the manner of an accelerating force. Accordingly, in the present working configuration, as in the third working configuration, the operating speed when the mirror 12 moves from the lower position to the upper position is increased, and even if sticking occurs, there is no danger of operational failure. In the present working configuration, furthermore, unlike the first and third working configurations, the braking force by means of a downward-oriented Lorentz force described above is not utilized when the mirror 12 moves from the lower position shown in FIG. 5 to the upper position shown in FIGS. 3 and 4; accordingly, the effects based on the braking force cannot be obtained.

In the present working configuration, as in the third working configuration, the circuit shown in FIG. 15 is mounted on the optical switch array 1 instead of the circuit shown in FIG. 7.

In the present working configuration, the signals (voltages) that are applied to the terminals V1, V2, V3, H1, H2, H3, C1, C2, C3 and C4 are supplied as control signals from an external control circuit corresponding to the external control circuit 6 shown in FIG. 1. Like the external control circuit 6 shown in FIG. 1, this external control circuit investigates optical switches whose position state is to be altered from the current position state, for example, on the basis of optical path switching state command signals, and successively sets state alteration periods one at a time for each of the optical switches whose state is to be altered. In cases where there are no optical switches whose position state is to be altered from the current position state, the voltage refresh period is set. Furthermore, in cases where a plurality of state alteration periods are set (that is, in cases where the number of optical switches whose position state is to be altered from the current position state is two or greater), voltage refresh periods may be set between the respective state alteration periods, or such voltage refresh periods may be omitted. For example, in a case where the number of optical switches whose position state is to be altered from the current position state is three, a sequence of state alteration period→voltage refresh period→state alteration period→voltage refresh period →state alteration period may be set, or state alteration periods may be continuously set. Furthermore, in the respective set state alteration periods, signals that are applied to the terminals V1, V2, V3, H1, H2, H3, C1, C2, C3 and C4 are supplied so that the control shown in FIG. 17 is realized in accordance with the commanded optical path switching states for the corresponding optical switches. Moreover, it goes without saying that this external control circuit may also be mounted on the optical switch array 1.

Figure 18:
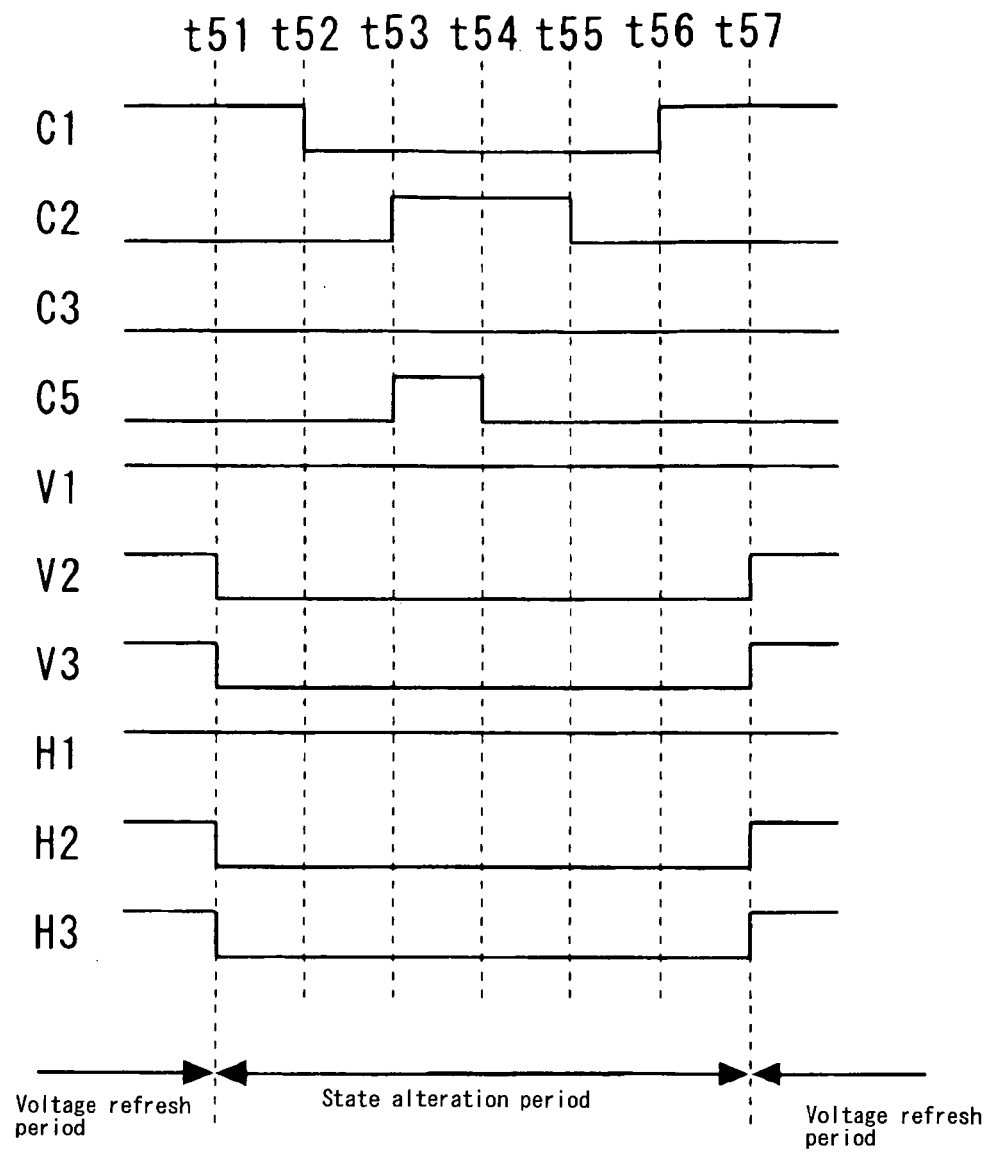
FIG. 18 is another timing chart showing the signals supplied to the respective terminals shown in FIG. 15.

FIG. 18 shows an example in which a sequence of voltage refresh period→state alteration period for the optical switch of row 1 column 1→voltage refresh period is set by this external control circuit. In the example shown in FIG. 18, during the voltage refresh period prior to time t51, the mirror 12 is held in the lower position. At time t51, a state alteration period is initiated for the optical switch of row 1 column 1; the terminals V2, V3, H2 and H3 are placed at a low level, so that the capacitors other than the capacitor C11 and the coils other than the coil L11 are isolated. Next, at time t52, the terminal C1 is placed at a low level, and at time t53, the terminal C2 is place at a high level; at the same time, the terminal C4 is placed at a high level. As a result, the charge charging the capacitor C11 is discharged, so that the electrostatic force voltage is reduced to zero, and at the same time, −I (a current that generates an upward-oriented Lorentz force in the coil layer 25) is caused to flow to the coil L11 as a Lorentz force current. This time t53 corresponds to time T57 in FIG. 17. Next, at time t54, the terminal C4 is placed at a low level. This time t54 corresponds to time T58 in FIG. 17. As a result, the mirror 12 moves into the upper position shown in FIGS. 3 and 4 and stops, so that this state is maintained. At time t55, the terminal C2 is placed at a low level; furthermore, after the terminal C1 is placed at a high level at time t56, this state alteration period is ended at time t57, and the voltage refresh period is initiated.

In the present working configuration, as was described above, the mobility range of the movable part can be expanded without applying a high voltage or sacrificing compact size, and the power consumption can be reduced as in the first and third working configurations. In the present working configuration, furthermore, as was described above, the operating speed when the mirror 12 moves from the lower position to the upper position is increased, and even if sticking occurs, there is no danger of operational failure as in the third working configuration.

[Fifth Working Configuration]

Figure 19:
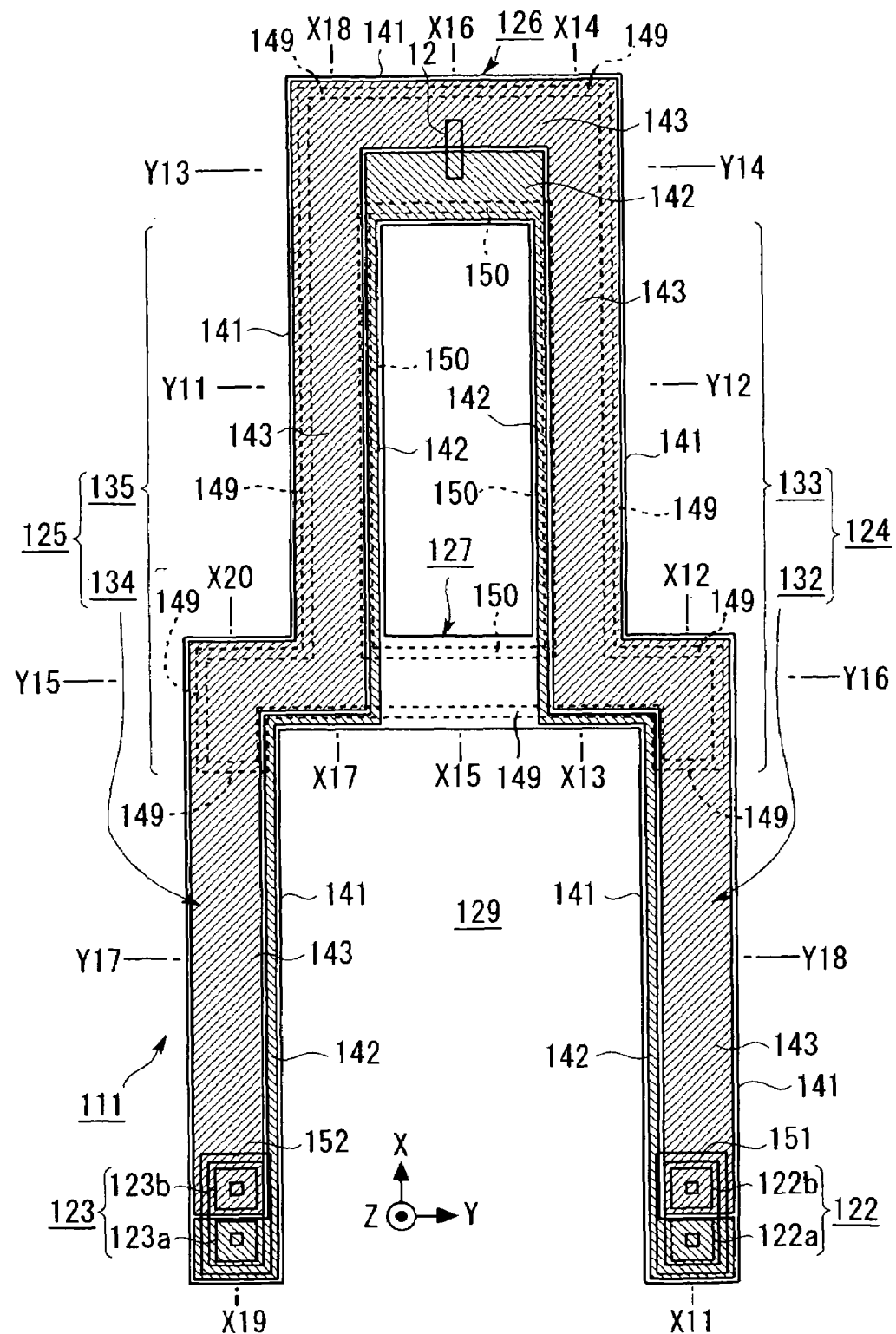
FIG. 19 is a schematic plan view which shows (in model form) one of the optical switches used as a unit element constituting the optical switch array used in an optical switching system constituting a fifth working configuration of the present invention.
Figure 20:
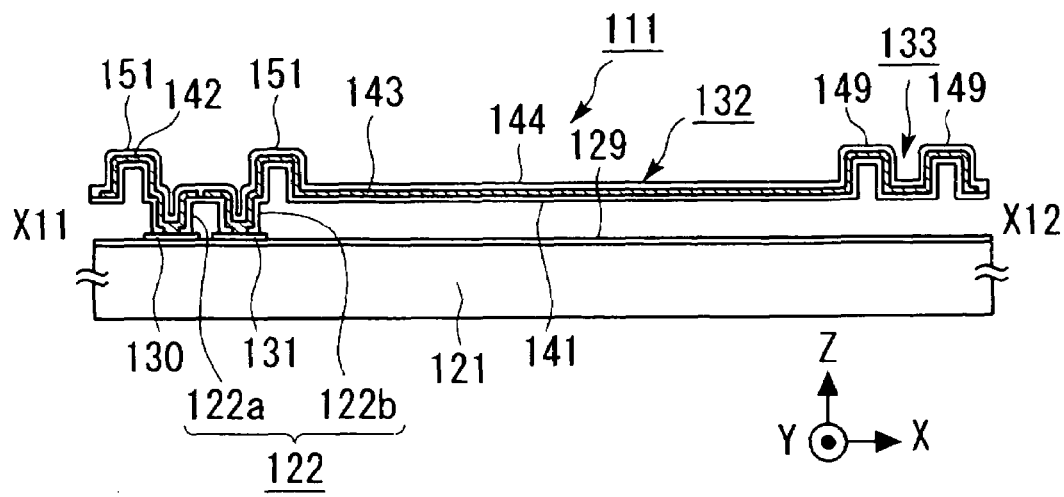
FIG. 20 is a schematic sectional view along line X11–X12 shown in FIG. 19.
Figure 21:
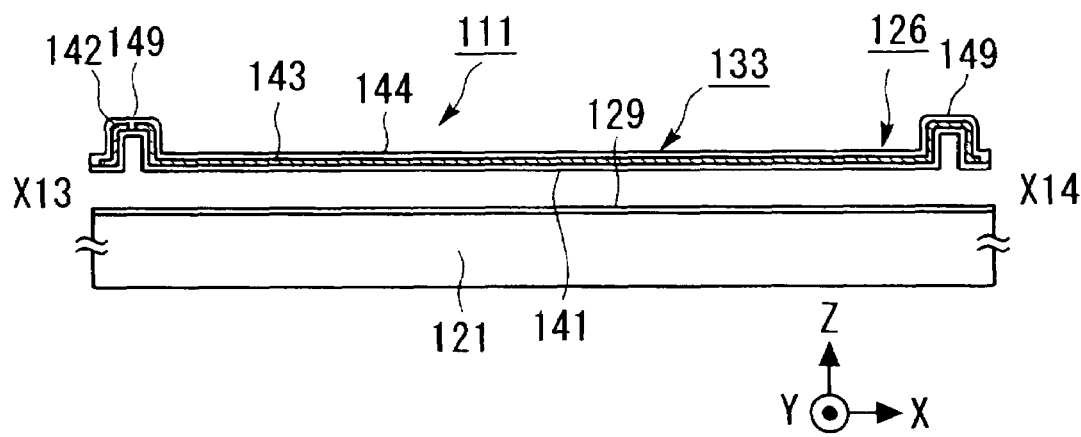
FIG. 21 is a schematic sectional view along line X13–X14 shown in FIG. 19.
Figure 22:
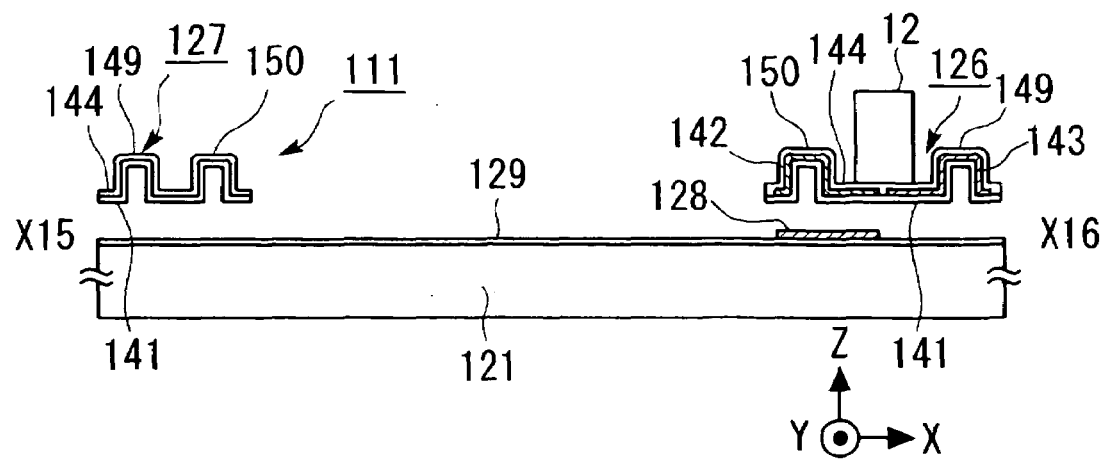
FIG. 22 is a schematic sectional view along line X15–X16 shown in FIG. 19.
Figure 23:
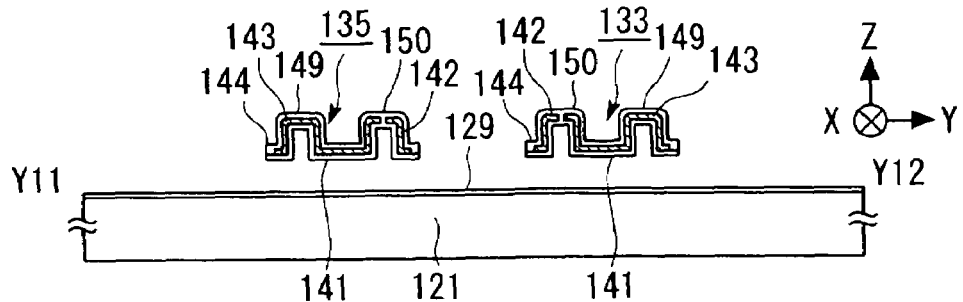
FIG. 23 is a schematic sectional view along line Y11–Y12 shown in FIG. 19.
Figure 24:
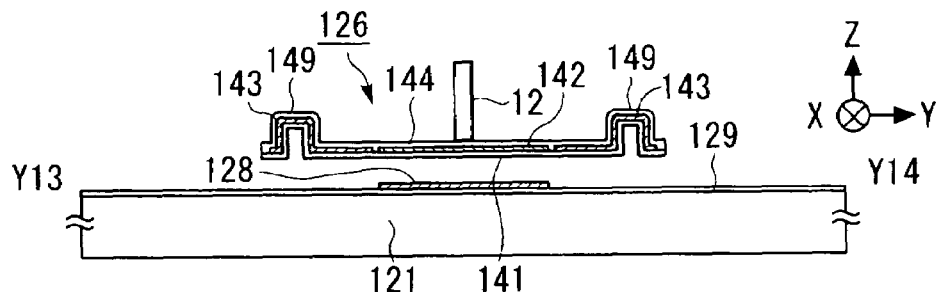
FIG. 24 is a schematic sectional view along line Y13–Y14 shown in FIG. 19.
Figure 25:
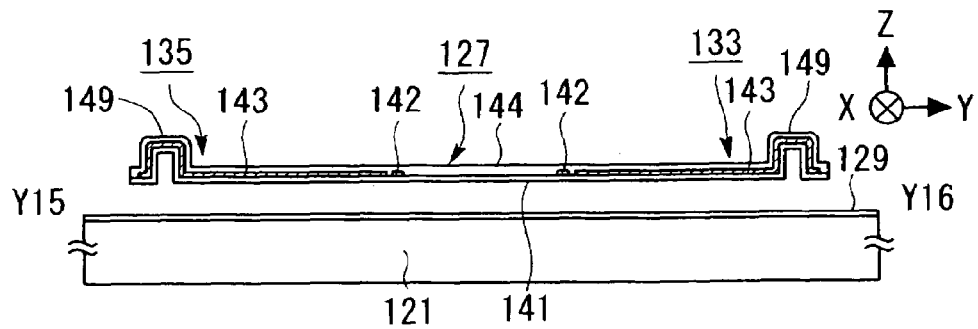
FIG. 25 is a schematic sectional view along line Y15–Y16 shown in FIG. 19.
Figure 26:
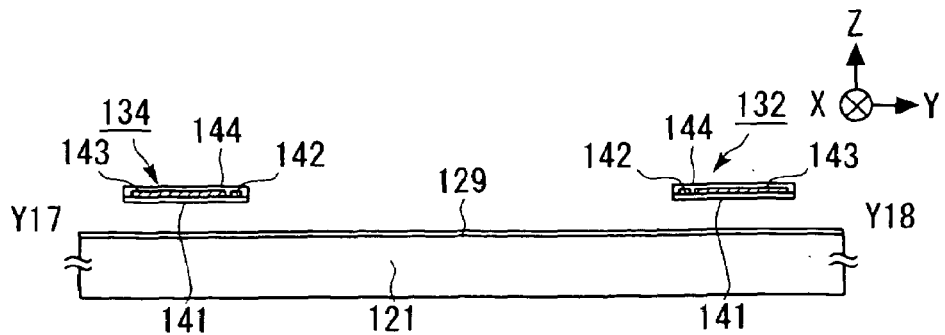
FIG. 26 is a schematic sectional view along line Y17–Y18 shown in FIG. 19.

FIG. 19 is a schematic plan view which shows (in model form) one of the optical switches (i.e., a single microactuator 111 and a single mirror 12 driven by this microactuator) used as a unit element constituting the optical switch array used in an optical switching system according to a fifth working configuration of the present invention. In FIG. 19, the SiN film 144 used as a protective film that is formed over the entire surface of the movable part and leg part is omitted, and the lines of the protruding strip parts 149 and 150 that should naturally be drawn as solid lines are shown as broken lines; furthermore, respectively different hatching is applied to the Al films 142 and 143. FIG. 20 is a schematic sectional view along line X11–X12 in FIG. 19. Although this is not shown in the figures, a schematic sectional view along line X19–X20 in FIG. 19 is the same as FIG. 20. FIG. 21 is a schematic sectional view along line X13–X14 in FIG. 19. Although this is not shown in the figures, a schematic sectional view along line X17–X18 in FIG. 19 is the same as FIG. 21. FIG. 22 is a schematic sectional view along line X15–X16 in FIG. 19. FIG. 23 is a schematic sectional view along line Y11–Y12 in FIG. 19. FIG. 24 is a schematic sectional view along line Y13–Y14 in FIG. 19. FIG. 25 is a schematic sectional view along line Y15–Y16.in FIG. 19. FIG. 26 is a schematic sectional view along line Y17–Y18 in FIG. 19. Furthermore, in FIGS. 20 through 26, the bridge constituent parts 132 and 134 are shown as not being bent in the direction of the Z axis. In actuality, however, the bridge constituent parts 132 and 134 are bent in the +Z direction by the stress of the films constituting these bridge constituent parts 132 and 134 in a state in which the movable part receives no force.

In the first through fourth working configurations described above, the microactuator that drives the mirror 12 has a structure that is held on both sides by flexure parts 27a and 27b. In the present working configuration, on the other hand, the microactuator 111 has a cantilever structure.

The microactuator 111 used in the present working configuration comprises a substrate 121 such as a silicon substrate or glass substrate, leg parts 122 and 123, two band-plate-form bridge parts 124 and 125 that extend mainly parallel to each other in the direction of the X axis (in a plan view seen from the direction of the Z axis), a connecting part 126 with a rectangular shape (as seen in a plan view) which is disposed on the tip ends (free ends, i.e., end portions in the +X direction) of the bridge parts 124 and 125, and which mechanically connects these bridge parts to each other, a connecting part 127 which mechanically connects the bridge constituent part 133 constituting the bridge part 124 and the bridge constituent part 135 constituting the bridge part 125 to each other on the side of the fixed ends of these parts in order to reinforce these parts, and a fixed electrode 128.

The fixed end (end portion in the –X direction) of the bridge part 124 is mechanically connected to the substrate 121 via the leg part 122, which consists of two separate leg parts 122a and 122b that have rising parts that respectively rise from the substrate 121 via wiring patterns 130 and 131 (omitted from FIG. 19) consisting of Al films that are formed on top of an insulating film 129 such as a silicon oxide film on the substrate 121. Similarly, the fixed end (end portion in the –X direction) of the bridge part 125 is mechanically connected to the substrate 121 via the leg part 123, which consists of two separate leg parts 123a and 123b that have rising parts that respectively rise from the substrate 121 via two wiring patterns (not shown in the figures) consisting of Al films that are formed on top of the insulating film 129 on the substrate 121. As was described above, the free ends of the bridge parts 124 and 125 are mechanically connected to each other by the connecting part 126, and the fixed ends of the bridge constituent parts 132 and 134 are mechanically connected to each other by the connecting part 127. Accordingly, in the present working configuration, the bridge parts 124 and 125 and connecting parts 126 and 127 as a whole constitute a movable part that has a cantilever structure. In the present working configuration, the substrate 121, fixed electrode 128 and insulating film 129 constitute a fixed part.

The bridge part 124 has two bridge constituent parts 132 and 133 that are mechanically connected in series in the direction of the X axis between the fixed end and free end of the movable part. The bridge constituent part 132 is constructed in a band-form plate shape that extends in the direction of the X axis (in a plan view seen from the direction of the Z axis). The bridge constituent part 133 is formed in a band-form plate shape, and as is shown in FIG. 19, this part has a shape that extends mainly in the direction of the X axis (in a plan view seen from the direction of the Z axis), but that is bent in the direction of the Y axis in a position on the –X side. The bridge constituent part 132 on the side of the fixed end (–X side) is formed as a plate spring part that can flex in the direction of the Z axis; on the other hand, the bridge constituent part 133 on the side of the free end (+X side) is formed as a rigid part that has substantial rigidity against flexing in the direction of the Z axis (toward the substrate 121 and toward the opposite side from this substrate) and flexing in other directions.

The bridge constituent part 132 is a three-layer thin film (two-layer thin film in the gap between the Al films 142 and 143) in which the lower-side SiN film 141, intermediate Al films 142 and 143 and SiN film 144 used as an upper-side protective film are laminated, and is constructed so that this part operates as a plate spring. The Al film 142 and Al film 143 are formed as films at the same level; however, as is shown in FIG. 19, these films are formed with a slight gap opened in the direction of the Y axis, so that the films are electrically separated from each other. The reason for this is that the Al film 142 is used as wiring to the movable electrode used for the electrostatic force, while the Al film 143 is used as wiring to form a current path that is used for the Lorentz force. Almost no current is caused to flow through the wiring used for the electrostatic force, while a relatively large current is caused to flow through the wiring used for the Lorentz force. Accordingly, in order to reduce the electrical resistance of the wiring used for the Lorentz force, the Al film 142 is formed with a narrow width, while the Al film 143 is formed with a broad width.

The bridge constituent part 133 is constructed as a thin film consisting of three layers (two layers in the gap between the Al films 142 and 143) in which the lower-side SiN film 141, intermediate Al films 142 and 143 and SiN film 144 used as an upper-side protective film (these films extending continuously "as is" from the bridge constituent part 132) are laminated. However, the bridge constituent part 133 is endowed with the rigidity described above by forming protruding strip parts 149 and 150 (described later).

In FIG. 20, the bridge constituent part 132 is shown as not being bent in the direction of the Z axis. In actuality, however, the bridge constituent part 132 is bent upward (toward the opposite side from the substrate 121, i.e., in the +Z direction) by the stress of the films 141 through 144 in a state in which no driving signal is supplied. Such a bent state can be realized by appropriately setting the formation conditions of the films 141, 142 and 144. On the other hand, the bridge constituent part 133 is not substantially bent in the direction of the Z axis regardless of the presence or absence of a driving signal; as a result of possessing the rigidity described above, this bridge constituent part 133 always maintains a flat-plate-form state without being bent by the stress of the films 141 through 144. Thus, in a state in which the bridge part 124 receives no force, the bridge constituent part 132 and bridge constituent part 133 have different bent or non-bent states.

In the present working configuration, the leg part 122 is constructed by extending the SiN films 141 and 144 and Al films 142 and 143 (that constitute the bridge constituent part 132) continuously "as is"; this leg part 122 has two separate leg parts 122a and 122b. The reason that the leg part 122 has two separate leg parts 122a and 122b is to separate the wiring that is used for the electrostatic force and the wiring that is used for the Lorentz force, and to electrically connect the Al film 142 and Al film 143 to individual wiring patterns 130 and 131, respectively, on the substrate 121. The Al film 142 is electrically connected to the wiring pattern 130 via an opening formed in the SiN film 141 in the separate leg part 122a. The Al film 143 is electrically connected to the wiring pattern 131 via an opening formed in the SiN film 141 in the separate leg part 122b. Furthermore, on the upper part of the leg part 122, a protruding strip part 151 is formed in a square shape so as to surround the separate leg parts 122a and 122b (in a plan view seen from the Z direction) in a comprehensive manner in order to reinforce the strength of the leg part 122.

The bridge part 125 and leg part 123 respectively have exactly the same structures as the bridge part 124 and leg part 122 described above. The bridge constituent parts 134 and 135 that constitute the bridge part 125 correspond to the bridge constituent parts 132 and 133 that constitute the bridge part 124. The separate leg parts 123a and 123b that constitute the leg part 123 respectively correspond to the separate leg parts 122a and 122b that constitute the leg part 122. Furthermore, a protruding strip part 152 that corresponds to the protruding strip part 151 described above is formed on the upper part of the leg part 123.

The connecting part 127 is formed by a two-layer film consisting of the SiN films 141 and 144 that extend continuously "as is" from the bridge constituent parts 133 and 135. The Al films 142 and 143 from the bridge constituent parts 133 and 135 do not extend to the connecting part 127; so that no electrical connections are made in the connecting part 127.

In the present working configuration, in order to endow the bridge constituent parts 133 and 135 and connecting parts 126 and 127 with rigidity in a single operation, a protruding strip part 149 is formed so as to surround the outer periphery of this entire region (as seen in a plan view), and a protruding strip part 150 is formed so that this part runs around the inner periphery of this entire region, as shown by the broken lines in FIG. 19. The bridge constituent parts 133 and 135 are reinforced by these protruding strip parts 149 and 150, and thus possess rigidity. The bridge constituent parts 133 and 135 are not substantially bent in the direction of the Z axis regardless of the presence or absence of a driving signal. Since these parts possess the rigidity described above, the parts always maintain a flat-plate-form state without being bent by the stress of the films 141 through 144.

The connecting part 126 is constructed by continuously extending the SiN films 141 and 144 and Al films 142 and 143 that constitute the bridge constituent parts 133 and 135 "as is." A mirror 12 consisting of Au, Ni or some other metal is disposed as a driven body on the connecting part 126.

In the connecting part 126, the Al film 142 and Al film 143 are separated as shown in FIG. 19; a portion of the Al film 142 in the connecting part 126 also acts as a movable electrode use for the electrostatic force. A fixed electrode 128 used for the electrostatic force (consisting of an Al film) is formed in the region of the substrate 121 that faces this movable electrode. Although this is not shown in the figures, the Al film that constitutes the fixed electrode 128 is also extended as a wiring pattern, and is utilized together with the wiring pattern 130, so that a voltage (electrostatic force voltage) can be applied as an electrostatic force driving signal across the fixed electrode 128 and the Al film 142 in the connecting part 126 that is also used as a movable electrode.

Meanwhile, as is seen from the above description, a current path that extends from the wiring pattern 131 beneath the separate leg part 122b of the leg part 122 to the wiring pattern (not shown in the figures) beneath the separate leg part 123b of the leg part 123 via the bridge constituent part 132→bridge constituent part 133 →connecting part 126→bridge constituent part 135→bridge constituent part 134 is formed by the Al film 143. Within this current path, the current path that runs along the direction of the Y axis in the connecting part 126 constitutes a part that generates a Lorentz force that is oriented in the direction of the Z axis when this part is placed in a magnetic field that is oriented in the direction of the X axis. Accordingly, when this part is placed in a magnetic field oriented in the direction of the X axis using a permanent magnet or the like (not shown in the figures), and a current (Lorentz force current) is caused to flow through the current path described above, a Lorentz force (driving force) acts in the Z direction on the Al film 143 in the connecting part 126. Furthermore, the orientation of this Lorentz force, i.e., +Z direction or −Z direction, is determined by the direction of the Lorentz force current.

Accordingly, in the present working configuration as well, a single optical switch can be placed in a state in which the mirror 12 is held on the upper side (i.e., the opposite side from the substrate 121) or a state in which the mirror 12 is held on the lower side (i.e., the side of the substrate 121) by performing control similar to any of the controls respectively indicated in FIGS. 6, 11 and 14 described above for this single optical switch. In the present working configuration, the system is devised so that such control can be performed.

Figure 27:
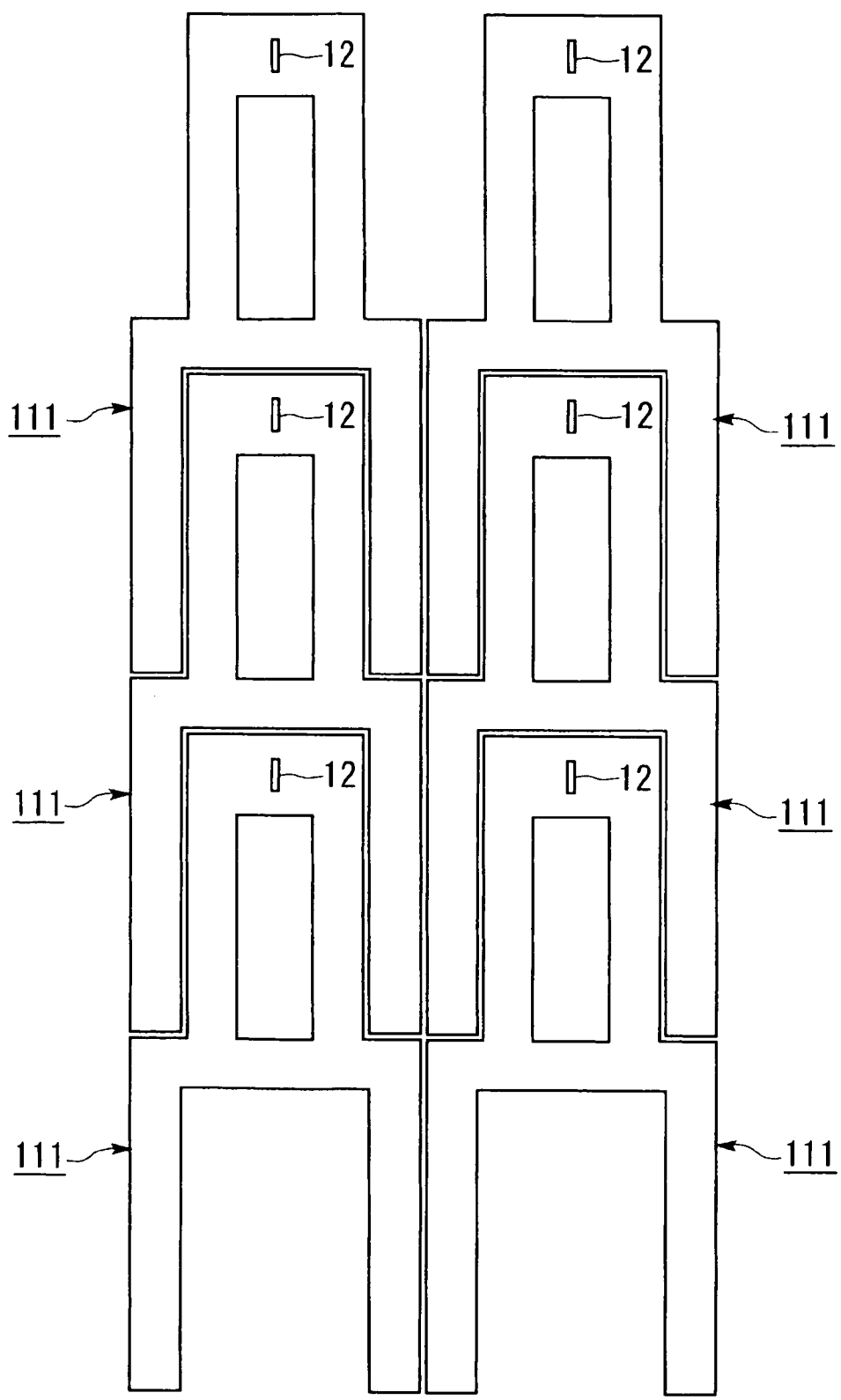
FIG. 27 is a schematic plan view which shows (in model form) the optical switch array used in the optical switching system constituting the fifth working configuration of the present invention.

In the present working configuration, as is shown in FIG. 27, a plurality of optical switches each constructed from a mirror 12 and a microactuator 111 that drives this mirror 12 are disposed in a two-dimensional matrix on the surface of a substrate 121, so that these optical switches constitute an optical switch array. In the present working configuration, as is shown in FIG. 19, the bridge constituent parts 133 and 135 have a shape which is bent in the direction of the Y axis at a position on the −X side as seen in a plan view that is viewed from the direction of the Z axis. As a result, these parts are formed into a shape in which intermediate portions of the bridge parts 124 and 125 are bent in the direction of the Y axis. Accordingly, as is shown in FIG. 27, in cases where a plurality of microactuators 111 are disposed in a two-dimensional configuration on the surface of a substrate 121, the disposition density can be increased. FIG. 27 is a schematic plan view which shows (in model form) the optical switch array used in the optical switching system of the present working configuration.

Furthermore, in the present working configuration, an SiN film 144 is formed as a protective film over the entire surface of the movable part and leg part; however, this SiN film 144 does not have to be formed. In this case, however, the SiN film 144 is left on the lower part of the mirror 12 in order to ensure electrical insulation of the Al films 142 and 143.

Although this is not shown in the figures, circuits similar to any of the circuits respectively shown in FIGS. 7, 12 and 15 are mounted on the optical switch array used in the present working configuration, in the same manner as in any of the first through fourth working configurations described above. For example, signals such as those shown in the corresponding figures among FIGS. 8, 13, 16 and 18 can be applied to such circuits in the same manner as in any of the first through fourth working configurations. Moreover, besides a MOS transistor manufacturing process, the optical switch array used in the present working configuration can also be manufactured utilizing other semiconductor manufacturing techniques such as film formation and patterning, etching, and formation and removal of sacrificial layers.

Figure 28:
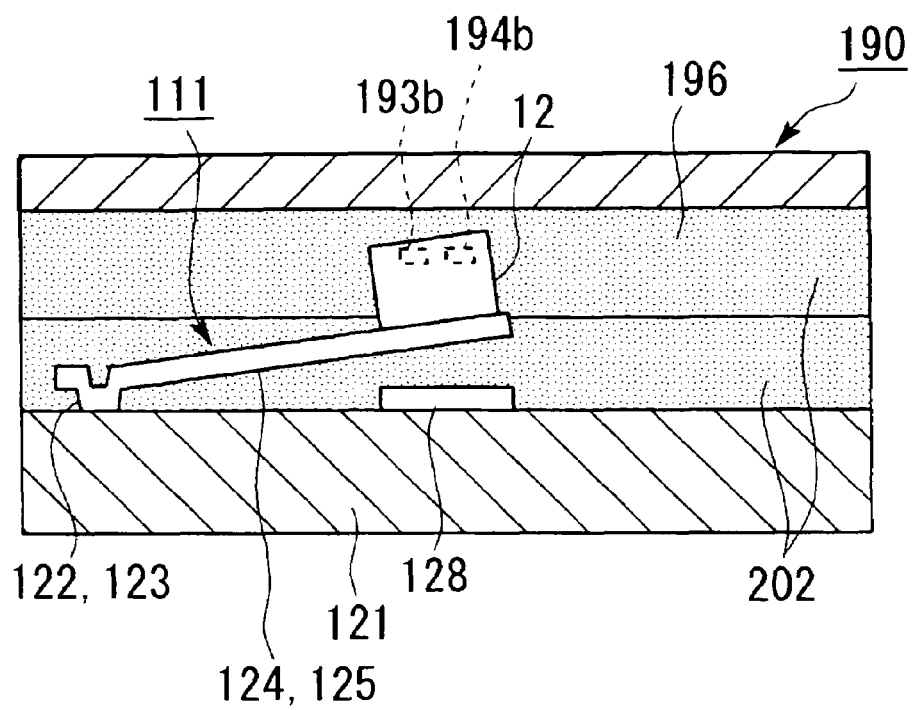
FIG. 28 is a schematic sectional view which shows (in model form) essential parts of the optical switching system in the fifth working configuration of the present invention in a state in which the mirror is held on the upper side.
Figure 29:
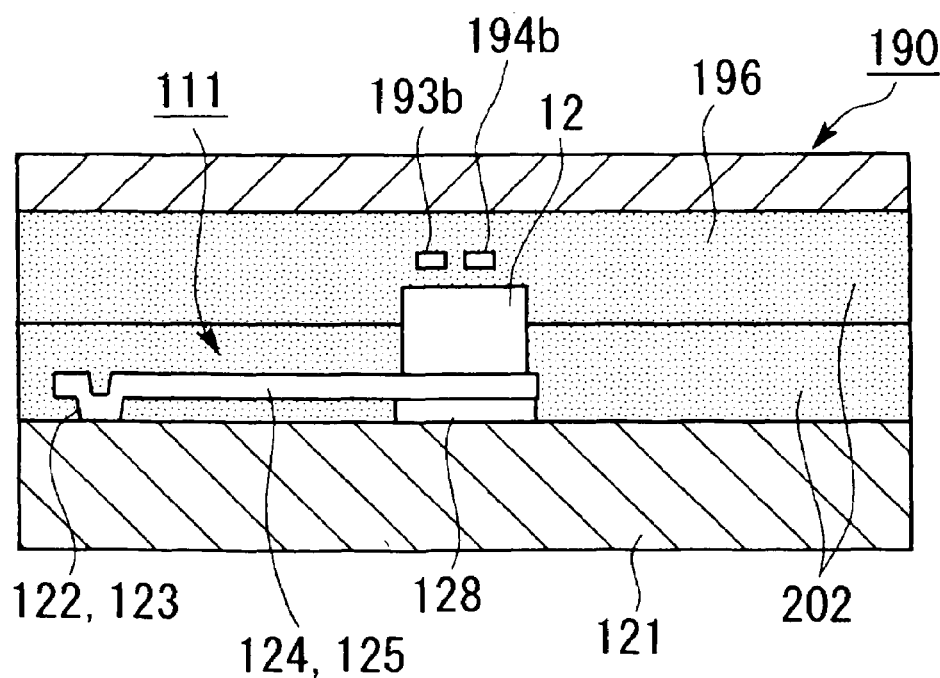
FIG. 29 is a schematic sectional view which shows (in model form) essential parts of the optical switching system in the fifth working configuration of the present invention in a state in which the mirror is held on the lower side.
Figure 30:
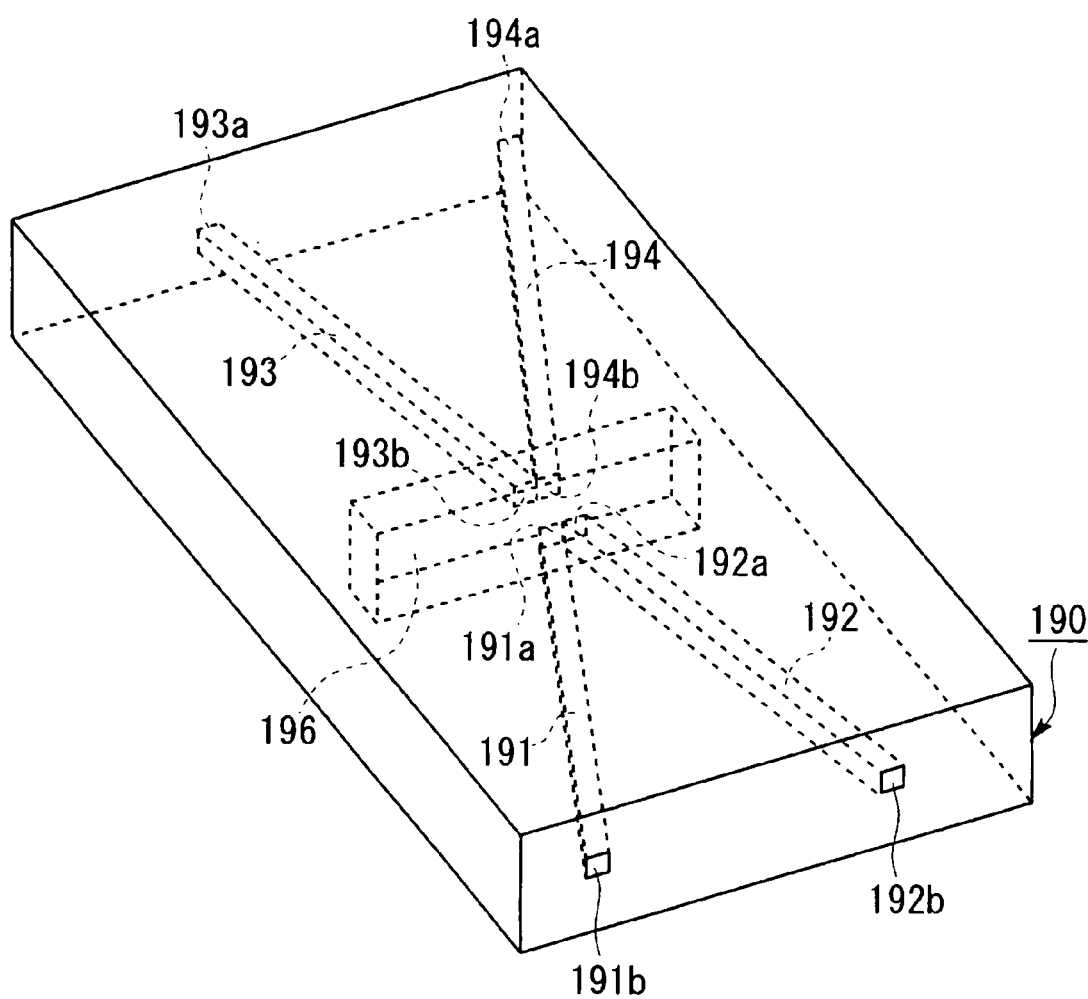
FIG. 30 is a schematic perspective view which shows (in model form) a portion of the optical waveguide substrate in FIGS. 28 and 29.

Besides the optical switch array described above, the optical switching system of the present working configuration also has an optical waveguide substrate 190 as shown in FIGS. 28 and 29. FIGS. 28 and 29 are schematic sectional views respectively showing (in model form) essential parts of the optical switching system constituting the fifth working configuration of the present invention. FIG. 28 shows a state in which the mirror 12 is held on the upper side and caused to advance into the optical path, while FIG. 29 shows a state in which the mirror 12 is held on the lower side and retracted from the optical path. Furthermore, in FIGS. 28 and 29, the structure of the microactuator 111 is shown in greatly simplified form. FIG. 30 is a schematic perspective view which shows (in model form) a portion of the optical waveguide substrate 190 shown in FIGS. 28 and 29.

In the present working configuration, as is shown in FIG. 30, the optical waveguide substrate 190 has four optical waveguides 191 through 194 that propagate the light that is to be switched. For example, the optical waveguide substrate 190 has a groove 196 with a width of several tens of microns in the central part, and the end surfaces 191a, 192a, 193b and 194b of the optical waveguides 191 through 194 are exposed in the side surfaces of this groove 196. As is shown in FIGS. 28 and 29, the gap between the end surface 191a and end surface 192a, and the gap between the end surface 193b and end surface 194b, are designed as gaps that can be covered by the reflective surface of the mirror 12.

As is shown in FIGS. 28 and 29, the optical waveguide substrate 190 is disposed on the surface of the substrate 121 of the microactuator 111, and a refractive index matching liquid 202 is sealed inside the space between the optical waveguide substrate 190 and the substrate 121, and inside the space of the groove 196 that communicates with this first space. Of course, it is not absolutely necessary to seal a refractive index matching liquid 202 inside these spaces; however, in a case where a refractive index matching liquid is used, optical beam loss is reduced. Furthermore, the substrate 121 and optical waveguide substrate 190 are positioned so that the mirror 12 can be inserted into the groove 196.

Furthermore, in FIGS. 28 through 30, the device is shown with only a single optical waveguide intersection point in the optical waveguide substrate 190. In actuality, however, optical waveguide intersection points are disposed in the form of a two-dimensional matrix by forming the optical waveguides in the form of a two-dimensional matrix in the optical waveguide substrate 190; in accordance with this, a plurality of microactuators 111 are disposed in two-dimensional form on the surface of the substrate 121, and the system is constructed so that mirrors 12 positioned at the respective intersection points of the optical waveguides are driven by the individual microactuators 111.

Moreover, in the optical switching system of the present working configuration, although this is not shown in the figures, a permanent magnet, for example, is disposed on the optical waveguide substrate 190 as the magnetic field generating part used to generate the magnetic field described above.

As is shown in FIG. 29, when the mirror 12 is positioned lower than the end surfaces 193b and 194b of the optical waveguides 193 and 194 by the control described above, for example, in a case where light is incident from the end surface 193a of the optical waveguide 193, the light that is propagated through the optical waveguide 193 is emitted from the end surface 193b, and is incident "as is" on the end surface 192a of the facing optical waveguide 192; this light is propagated through the optical waveguide 192, and is emitted from the end surface 192b. Furthermore, for example, in a case where light is incident from the end surface 191b of the optical waveguide 191, the light that is propagated through the optical waveguide 191 is emitted from the end surface 191a, and is incident "as is" on the end surface 194b of the facing optical waveguide 194; this light is propagated through the optical waveguide 194, and is emitted from the end surface 194a.

On the other hand, as is shown in FIG. 28, when the mirror 12 is positioned so as to cover the end surfaces 193b and 194b of the optical waveguides 193 and 194 by the control described above, for example, in a case where light is incident from the end surface 193a of the optical waveguide 193, the light that is propagated through the optical waveguide 193 is emitted from the end surface 193b, and is reflected by the mirror 12, so that this light is incident on the end surface 194b of the optical waveguide 194. This light is then propagated through the optical waveguide 194, and is emitted from the end surface 194a. Furthermore, for example, in a case where light is incident from the end surface 191b of the optical waveguide 191, the light that is propagated through the optical waveguide 191 is emitted from the end surface 191a, and is reflected by the mirror 12, so that this light is incident on the end surface 192a of the optical waveguide 192. This light is then propagated through the optical waveguide 192, and is emitted from the end surface 192b Effects similar to those in the case of the first through fourth working configurations can also be obtained by the present working configuration.

Respective working configurations of the present invention have been described above. However, the present invention is not limited to these working configurations.

For example, the working configurations described above each involved an example of an optical switching system with an optical switch array in which a plurality of optical switches were disposed in a two-dimensional configuration. However, the present invention may also be an optical switching system which has only a single optical switch. Furthermore, the working configurations described above were examples in which the microactuator device of the present invention was applied to an optical switching system; however, uses of the microactuator device of the present invention are not limited to optical switching systems.

The invention claimed is:

1. A microactuator device comprising:
   (i) a magnetic field generating part which generates a magnetic field;
   (ii) a microactuator which comprises:
      a fixed part which includes a first electrode part; and
      a movable part which is movably disposed with respect to the fixed part, and which includes a second electrode part and a current path placed in the magnetic field;
      wherein an electrostatic force is generated between the second electrode part and the first electrode part when a voltage is applied across the second electrode part and the first electrode part, and the current path generates a Lorentz force when powered;
      wherein the movable part is movable between a first position in which the electrostatic force is increased and a second position in which the electrostatic force drops or disappears, and when the movable part is displaced from the second position, the movable part is urged by a return force to return to the second position; and wherein the current path is disposed so that a Lorentz force can be generated in a direction from the first position toward the second position, and in an opposite direction; and (iii) a control part which controls the voltage that is applied across the first and second electrode parts and the current that flows through the current path;

wherein when the movable part is caused to move from the first position to the second position, the control part controls the current so that the Lorentz force is generated, and gradually decreases, in a direction extending from the second position toward the first position, at least while the movable part is moving from a point intennediate between the first position and the second position to a point in a vicinity of the second position.

2. The microactuator device according to claim 1, wherein the control part controls the current so that when the movable part is caused to move from the first position to the second position, the Lorentz force is generated in the direction extending from the first position toward the second position while the movable part is moving from the first position to a point that is intermediate between the first position and the second position.

3. The microactuator device according to claim 1, wherein the movable part comprises a thin film.

4. The microactuator device according to claim 1, wherein the first electrode part and the second electrode part face each other,
wherein the movable part is mechanically connected to the fixed part via a spring part, and a gap between the first and second electrode parts is narrower when the movable part is positioned in the first position than when the movable part is positioned in the second position, and
wherein the return force is generated by the spring part.

5. The microactuator device according to claim 1, wherein the control part controls the voltage and the current such that:
the movable part is caused to move toward the first position by at least one of the Lorentz force and the electrostatic force,
the movable part is held in the first position by the electrostatic force, and
the current does not flow during at least a steady holding state in which the movable part is held in the first position.

6. An optical switching system comprising:
the microactuator device according to claim 1, and
a mirror that is disposed on the movable part.

7. The optical switching system according to claim 6, wherein a plurality of sets of the microactuator and the mirror are provided, and the plurality of sets are disposed in a two-dimensional configuration.

8. A microactuator device comprising:
(i) a magnetic field generating part which generates a magnetic field;
(ii) a microactuator which comprises:
a fixed part which includes a first electrode part; and
a movable part which is movably disposed with respect to the fixed part, and which includes a second electrode part and a current path placed in the magnetic field;
wherein an electrostatic force is generated between the second electrode cart and the first electrode part when a voltage is applied across the second electrode part and the first electrode part, and the current path generates a Lorentz force when powered;
wherein the movable part is movable between a first position in which the electrostatic force is increased and a second position in which the electrostatic force drops or disappears, and when the movable part is displaced from the second position, the movable part is urged by a return force to return to the second position; and
wherein the current path is disposed so that a Lorentz force can be generated in a direction from the first position toward the second position, and in an opposite direction; and
(iii) a control part which controls the voltage that is applied across the first and second electrode parts and the current that flows through the current path;
wherein when the movable part is caused to move from the first position to the second position, the control part controls the current so that the Lorentz force is generated in the direction extending from the first position toward the second position while the movable part is moving from the first position to a point that is intermediate between the first position and the second position; and
wherein the current path is separated and electrically insulated from the second electrode part.

9. The microactuator device according to claim 8, wherein the movable part comprises a thin film.

10. The microactuator device according to claim 8, wherein the first electrode part and the second electrode part face each other,
wherein the movable part is mechanically connected to the fixed part via a spring part, and a gap between the first and second electrode parts is narrower when the movable part is positioned in the first position than when the movable part is positioned in the second position, and
wherein the return force is generated by the spring part.

11. The microactuator device according to claim 8, wherein the control part controls the voltage and the current such that:
the movable part is caused to move toward the first position by at least one of the Lorentz force and the electrostatic force,
the movable part is held in the first position by the electrostatic force, and
the current does not flow during at least a steady holding state in which the movable part is held in the first position.

12. An optical switching system comprising:
the microactuator device according to claim 8, and
a mirror that is disposed on the movable part.

13. The optical switching system according to claim 12, wherein a plurality of sets of the microactuator and the mirror are provided, and the plurality of sets are disposed in a two-dimensional configuration.

14. A microactuator device comprising:
(i) a magnetic field generating part which generates a magnetic field;
(ii) a microactuator which comprises:
a single substrate which includes a first electrode part; and
a movable part which is movably disposed with respect to the single substrate, and which includes a second electrode part and a current path placed in the magnetic field;

wherein an electrostatic force is generated between the second electrode part and the first electrode part when a voltage is applied across the second electrode part and the first electrode part, and the current path generates a Lorentz force when powered;

wherein the movable part is movable between a first position in which the electrostatic force is increased and a second position in which the electrostatic force drops or disappears, and when the movable part is displaced from the second position, the movable part is urged by a return force to return to the second position; and wherein the current path is disposed so that a Lorentz force can be generated in a direction from the first position toward the second position, and in an opposite direction; and (iii) a control part which controls the voltage that is applied across the first and second electrode parts and the current that flows through the current path;

wherein when the movable part is caused to move from the first position to the second position, the control part controls the current so that the Lorentz force is generated in the direction extending from the first position toward the second position while the movable part is moving from the first position to a point that is intermediate between the first position and the second position; and wherein the movable part is mechanically connected to the single substrate via a spring part.

15. The microactuator device according to claim 14, wherein the movable part comprises a thin film.

16. The microactuator device according to claim 14, wherein the first electrode part and the second electrode part face each other, wherein a gap between the first and second electrode parts is narrower when the movable part is positioned in the first position than when the movable part is positioned in the second position, and wherein the return force is generated by the spring part.

17. The microactuator device according to claim 14, wherein the control part controls the voltage and the current such that:

the movable part is caused to move toward the first position by at least one of the Lorentz force and the electrostatic force, the movable part is held in the first position by the electrostatic force, and the current does not flow during at least a steady holding state in which the movable part is held in the first position.

18. An optical switching system comprising:
the microactuator device according to claim 14, and
a mirror that is disposed on the movable part.

19. A microactuator device comprising:
(i) a magnetic field generating part which generates a magnetic field;
(ii) a microactuator which comprises:
a fixed part which includes a first electrode part; and
a movable part which is movably disposed with respect to the fixed part, and which includes a second electrode part and a current path placed in the magnetic field;

wherein an electrostatic force is generated between the second electrode part and the first electrode part when a voltage is applied across the second electrode part and the first electrode part, and the current path generates a Lorentz force when powered;

wherein the movable part is movable between a first position in which the electrostatic force is increased and a second position in which the electrostatic force drops or disappears, and when the movable part is displaced from the second position, the movable part is urged by a return force to return to the second position; and wherein the current path is disposed so that a Lorentz force can be generated in a direction from the first position toward the second position, and in an opposite direction; and (iii) a control part which controls the voltage that is applied across the first and second electrode parts and the current that flows through the current path;

wherein when the movable part is caused to move from the first position to the second position, the control part controls the current so that the Lorentz force is generated in the direction extending from the first position toward the second position while the movable part is moving from the first position to a point that is intermediate between the first position and the second position; and wherein the control part controls the current to become zero when the movable part is at an intermediate position between the first position and the second position.

20. A microactuator device comprising:
(i) a magnetic field generating part which generates a magnetic field;
(ii) a microactuator which comprises:
a fixed part which includes a first electrode part; and
a movable part which is movably disposed with respect to the fixed part, and which includes a second electrode part and a current path placed in the magnetic field;

wherein an electrostatic force is generated between the second electrode part and the first electrode part when a voltage is applied across the second electrode part and the first electrode part, and the current path generates a Lorentz force when powered;

wherein the movable part is movable between a first position in which the electrostatic force is increased and a second position in which the electrostatic force drops or disappears, and when the movable part is displaced from the second position, the movable part is urged by a return force to return to the second position; and wherein the current path is disposed so that a Lorentz force can be generated in a direction from the first position toward the second position, and in an opposite direction; and (iii) a control part, which controls the voltage that is applied across the first and second electrode parts and the current that flows through the current path;

wherein when the movable part is caused to move from the first position to the second position, the control part controls the current so that the Lorentz force is generated in the direction extending from the first position toward the second position while the movable part is moving from the first position to a point that is intermediate between the first position and the second position; and wherein the movable part is mechanically connected to the fixed part via a spring part that is connected at only one end portion of the movable part, and the movable part is not connected to the fixed part except by the spring part at the one end portion thereof.

* * * * *